United States Patent [19]
Arikawa

[11] Patent Number: 4,986,612
[45] Date of Patent: Jan. 22, 1991

[54] BRAKE FLUID PRESSURE CONTROL APPARATUS FOR A VEHICLE

[75] Inventor: Tetsuro Arikawa, Kanagawa, Japan

[73] Assignee: Nippon A B S, Ltd., Tokyo, Japan

[21] Appl. No.: 262,530

[22] Filed: Oct. 25, 1988

[30] Foreign Application Priority Data

Oct. 26, 1987 [JP] Japan .............................. 62-269819
Nov. 2, 1987 [JP] Japan .............................. 62-277870

[51] Int. Cl.⁵ .............................................. B60T 8/32
[52] U.S. Cl. ...................................... 303/110; 180/197; 303/111; 303/119
[58] Field of Search ............... 303/119, 114, 115, 116, 303/113, 9.62, 9.75, 100, 110, 111; 180/197

[56] References Cited

U.S. PATENT DOCUMENTS

| | | | |
|---|---|---|---|
| 3,717,385 | 2/1973 | Michellone | 303/119 |
| 4,418,966 | 12/1983 | Hattwig | 303/119 X |
| 4,453,782 | 6/1984 | Arikawa et al. | 303/116 |
| 4,509,802 | 4/1985 | Soleder et al. | 303/110 |
| 4,585,281 | 4/1986 | Schnurer | 303/119 X |
| 4,637,664 | 1/1987 | Arikawa | 303/111 |
| 4,740,040 | 4/1988 | Arikawa | 303/96 |
| 4,744,610 | 5/1988 | Arikawa | 303/92 |
| 4,753,493 | 6/1988 | Arikawa | 303/110 |
| 4,776,644 | 10/1988 | Arikawa | 303/111 |
| 4,783,126 | 11/1988 | Arikawa | 303/96 |
| 4,818,039 | 4/1989 | Bertling et al. | 303/119 X |

FOREIGN PATENT DOCUMENTS 63-34274 2/1988 Japan .

*Primary Examiner*—Matthew C. Graham
*Attorney, Agent, or Firm*—McAndrews, Held & Malloy, Ltd.

[57] ABSTRACT

A brake fluid pressure control apparatus for a vehicle includes a fluid pressure control valve device arranged between a master cylinder and a wheel cylinder, receiving control signals from a control unit measuring the skid condition of the wheel to control the brake fluid pressure to the wheel cylinder. A hydraulic reservoir stores the brake fluid discharged through the fluid pressure control valve device from the wheel cylinder and a pressure fluid supply conduit connects the master cylinder with the fluid pressure control valve device. A fluid pump returns the brake fluid from the hydraulic reservoir into the pressure fluid supply conduit and a valve apparatus is arranged in a conduit connecting the discharge side of the fluid pump with the master cylinder side, in the pressure fluid supply conduit. The valve apparatus takes a first position connecting both sides and a second position that cuts off the fluid flow from the discharging side of the fluid pump toward the master cylinder side. The valve apparatus is normally in the first position. During anti-skid control, it takes the first position continuously for a certain time depending on the control time of the fluid pressure decrease and continuously for another certain time depending on the control time if the fluid pressure is increased after the fluid pressure decrease, and it takes the second position continously for times other than the certain time and/or the other certain time. Alternatively, it cycles between the first and second position for a certain time depending on the control time of the fluid pressure decrease and/or for another certain time depending on the control time of increasing again the fluid pressure after the fluid pressure decrease, and it takes the second position for times other than the certain time and/or the another certain time.

18 Claims, 13 Drawing Sheets

BRAKE FLUID PRESSURE CONTROL APPARATUS FOR A VEHICLE

BACKGROUND OF THE INVENTION

1. Filed of the Invention

This invention relates to a brake fluid pressure control apparatus for a vehicle which can prevent locking of the wheels or which can prevent locking of the wheels and also control the traction of the drive wheels on acceleration of the vehicle, as when the vehicle starts.

2. Description of the Prior Art

For example, U.S. Pat. No. 4395073 discloses a brake fluid pressure control apparatus in a skid control system for a vehicle having at least one wheel and a brake for the wheel which includes a fluid pressure control valve device arranged between a master cylinder and a wheel cylinder of a brake for the wheel. The fluid pressure control valve device receives control signals from a control unit measuring the skid condition of the wheel to control the brake fluid pressure to the wheel cylinder. A hydraulic reservoir reserves the brake fluid discharged through the fluid pressure control valve device from the wheel cylinder when the brake fluid pressure to the wheel cylinder is decreased with control of the fluid pressure control value device. A pressure fluid supply conduit connects the master cylinder with the fluid pressure control valve device and a fluid pump returns the brake fluid from the hydraulic reservoir into the pressure fluid supply conduit. A first check valve arranged in the pressure fluid supply conduit is opened when the brake fluid flows from the master cylinder toward the fluid pressure control valve device, and the outlet of the fluid pump is connected to the pressure fluid supply conduit between the first check valve and the fluid pressure control valve device. A pressure fluid return conduit connecting the master cylinder with the wheel cylinder and a second check valve arranged in the pressure fluid return conduit is opened when the brake fluid flows from the wheel cylinder toward the master cylinder, and a hydraulic accumulator or a fluid pressure adjusting valve receives the brake fluid discharged from the fluid pump.

With the above-described brake fluid pressure control apparatus, the wheels can be prevented from locking and kickback of the brake pedal can be avoided when the anti-skid control operator. However, since the hydraulic accumulator consists of a strong and heavy spring, a piston urged by the spring and a casing for the spring and piston, the whole apparatus is large-sized and heavy. It is very difficult to fit such an apparatus in a limited space such as the engine compartment of a vehicle.

On the other hand, the driving slip or traction control apparatus which can control or prevent the slip of the drive wheel vehicle acceleration with the increasing engine power, has been developed recently. This Applicant proposed a brake fluid pressure control apparatus which can prevent the wheels from locking and further control the drive wheels from slipping in the Japanese Patent Application No. 16732/1987. However, this apparatus is nearly equal to the arrangement in which the drive slip control apparatus is merely added to the lock preventing apparatus. As a result, the whole apparatus is large and heavy, and is accordingly costly.

SUMMARY OF THE INVENTION

Accordingly, it is an object of this invention to provide a brake fluid pressure control apparatus for a vehicle which can be small-sized and light, and can prevent the wheels from locking while preserving good pedal feeling.

Another object of this invention is to provide a brake fluid pressure control apparatus for a vehicle which can be small-sized and light and can not only prevent the wheels from locking but can also minimize slippage of the drive wheels while preserving good pedal feeling and minimizing cost.

In accordance with an aspect of this invention, in a brake fluid pressure control apparatus for a vehicle having at least one wheel and a brake for the wheel including:

(A) a fluid pressure control valve device arranged between a master cylinder and a wheel cylinder of the brake for the wheel, the fluid pressure control valve device receiving control signals from a control unit measuring the skid condition of the wheel to control the brake fluid pressure to the wheel cylinder;

(B) a hydraulic reservoir which, when the brake fluid pressure to the wheel cylinder is decreased with control of the fluid pressure control valve device, reserves the brake fluid discharged through the fluid pressure control valve device from the wheel cylinder;

(C) a pressure fluid supply conduit connecting the master cylinder with the fluid pressure control valve device;

(D) a fluid pump for returning the brake fluid from the hydraulic reservoir into the pressure fluid supply conduit; and (E) a valve apparatus arranged in a conduit connecting the discharging side of the fluid pump with the master cylinder side, in the pressure fluid supply conduit, the valve apparatus taking a first position connect both sides and a second position cutting off the fluid flow from the discharging side of the fluid pump toward the master cylinder side. The valve apparatus normally takes the first position, but during anti-skid control it takes the first position for a certain time depending on the control time of the fluid pressure decrease and/or another certain time depending on the control time of increasing again the fluid pressure after the fluid pressure decrease, and takes the second position for times other than the control times.

In accordance with another aspect of this invention, in a brake fluid pressure control apparatus for a vehicle having at least one wheel and a brake for the wheel including:

(A) a braking slip control apparatus for the wheel;

(B) a driving slip control apparatus for the wheel;

(C) a fluid pressure control valve device receiving control signals from a control unit measuring the braking slip or driving slip condition of the wheel to control the brake fluid pressure to the wheel cylinder of the wheel;

(D) a hydraulic reservoir which, when the brake fluid pressure to the wheel cylinder is decreased with control of the fluid pressure control valve device, reserves the brake fluid discharged through the fluid pressure control valve device from the wheel cylinder;

(E) a fluid pump that returns the brake fluid from the hydraulic reservoir into a brake fluid supply conduit connecting a master cylinder with the wheel cylinder and (F) a valve apparatus arranged in a conduit connecting the discharging side of the fluid pump with the master cylinder side, the valve apparatus taking a first position connecting both sides and a second position for cutting off the fluid flow from the discharging side of the fluid pump toward the master cylinder side, the valve apparatus normally takes the first position, and during braking slip control, takes the first position for a certain time depending on the control time of the fluid pressure decrease and/or another certain time depending on the control time of increasing again the fluid pressure after the fluid pressure decrease, and takes the second position for times other than the control times, and during driving slip control, the valve apparatus takes the second condition.

In accordance with a further aspect of this invention, in a brake fluid pressure control apparatus for a vehicle, including:

(A) a braking slip control apparatus for a pair of front wheels and a pair of rear wheels, (B) a driving slip control apparatus for the wheels;

(C) a first fluid pressure control valve device arranged between a first fluid pressure generating chamber of a brake master cylinder and a brake apparatus of one of the front wheels or rear wheels to control the brake fluid pressure to the brake apparatus of the one of the front wheels or rear wheels;

(D) a second fluid pressure control valve device arranged between a second fluid pressure generating chamber of the brake master cylinder and a brake apparatus of the other of the front wheels or rear wheels to control the brake fluid pressure to the brake apparatus of the other of the front wheels or rear wheels;

(E) a hydraulic reservoir which, when the brake fluid pressure to the brake apparatus is decreased with control of the first or second fluid pressure control valve device, reserves the brake fluid discharged through the first or second fluid pressure control valve device from the brake apparatus;

(F) a fluid pump means for returning the brake fluid from the hydraulic reservoir into pressure fluid supply conduits connecting the master cylinder and the first and second fluid pressure control valve devices;

(G) a control unit for measuring the braking slip or driving slip condition and generating instructions to control the first and second fluid pressure control valve devices; and (H) a pressure selecting apparatus for generating a fluid pressure in accordance with the lower one of the brake fluid pressures of the front wheels or rear wheels controlled with the first and second fluid pressure control valve devices in the brake slip control being arranged between the brake apparatus of the front wheels and those of the rear wheels; the valve apparatus including a pair of valve parts each for opening and closing a conduit between the brake apparatus of the ones of the front and rear wheels in the corresponding one of the two conduit systems, the valve parts being arranged so as to open and close in opposite directions to each other, and a piston or a piston group consisting of plural piston members, including a pair of fluid pressure receiving portions or piston members which receive the fluid pressure of the corresponding one of the first and second fluid pressure generating chambers of the master cylinder, and the fluid pressure of the corresponding one of the brake apparatus of the front wheels or rear wheels in the opposite directions, respectively, the piston or piston group located normally at a neutral position for opening the valve parts, and movable in the directions to close selectively any one of the valve parts in the braking slip control, the hydraulic reservoir always reserving brake fluid, and a valve apparatus arranged in a conduit connecting the discharging side of the said fluid pump with the master cylinder side, in the pressure fluid supply conduit, the valve apparatus normally takes a first position connecting both sides and a second position cutting off the fluid flow from the side of the first or second fluid pressure control valve device towards the master cylinder side and during the braking slip control, takes the first position for a certain time depending on the control time of the fluid pressure decrease and/or another certain time depending on the control time of increasing again the fluid pressure after the fluid pressure decrease, and then takes the second position for times other than the control times, and takes the second position during the driving slip control.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
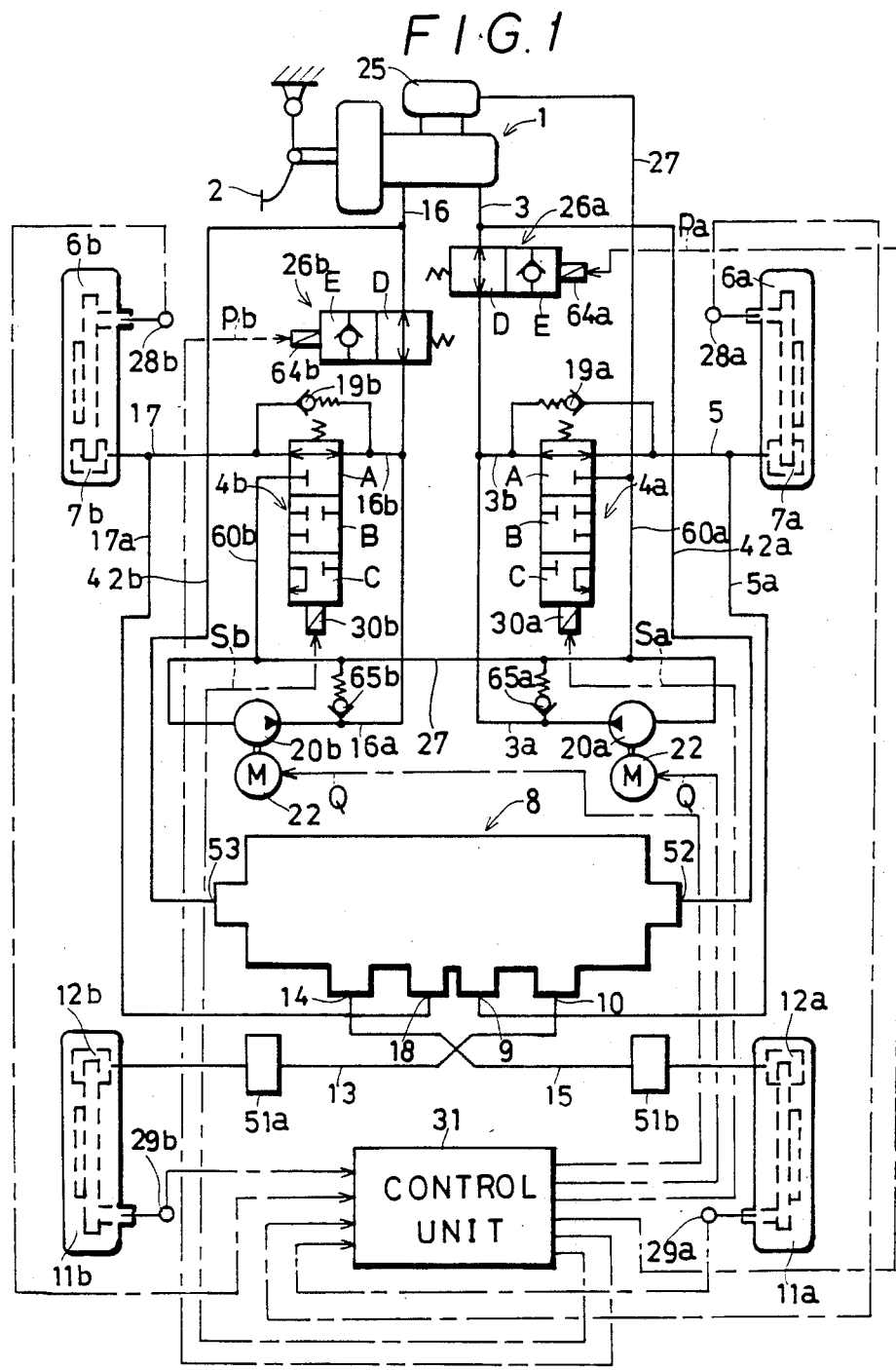
FIG. 1 is a schematic view of a brake fluid pressure control apparatus according to a first embodiment of this invention.

In FIG. 1, a brake pedal 2 is connected to a tandem master cylinder 1 which is provided with a hydraulic reservoir 25 which always reserves brake fluid. One fluid pressure chamber of the tandem master cylinder 1 is connected to a wheel cylinder 7a of a right front wheel 6a through a conduit 3, a check valve device 26a, an electromagnetic three-position valve device 4a and a conduit 5. The conduit 5 is further connected to a first input port 9 of a pressure selecting apparatus 8 to be described below. A first output port 10 is connected to a wheel cylinder 12b of a left rear wheel 11b through a conduit 13 and a proportioning valve 51a.

Another fluid pressure chamber of the tandem master cylinder 1 is connected to a wheel cylinder 7b of the left front wheel 6b through a conduit 16, a check valve device 26b, an electromagnetic three-position valve device 4b and a conduit 17. The conduit 17 is further connected to a second input port 18 of the apparatus 8. A second output port 14 of the apparatus 8 is connected to a wheel cylinder 12a of a right rear wheel 11a through a conduit 15 and a proportioning valve 51b.

Discharge openings of the valve devices 4a and 4b are connected through conduits 60a and 60b to the hydraulic reservoirs 25 of the master cylinder 1. A reserving chamber of the reservoir 25 is connected to inlet openings of fluid pressure pumps 20a and 20b.

Although the fluid pressure pumps 20a and 20b are shown schematically, each of them consists of a pair of casings, pistons slidably fitted to the casings, an electromotor 22 reciprocating the piston, and check valves. Supply openings of the fluid pressure pump 20a and 20b are connected to the conduits 3 and 16. Although two electro-motors 22 are shown for the convenience of the drawing, they are one unit for driving the pumps 20a and 20b.

Wheel speed sensors 28a, 28b, 29a and 29b are associated with the wheels 6a, 6b, 11a and 11b respectively and they generate pulse signals having frequencies proportional to the rotational speeds of the wheels 6a, 6b, 11a and 11b. The pulse signals of the wheel speed sensors are supplied to a control unit 31.

Although described hereinafter in detail, the control unit 31 consists of a drive slip control part and an antiskid control part.

Control signals Sa and Sb, and motor drive signal as the calculation or measurement results are generated from the control unit 31, and are supplied to solenoid portions 30a and 30b of the valve devices 4a and 4b and motor 22, respectively. Dashed lines represent electric lead wires.

Although schematically shown, the electromagnetic valve devices 4a and 4b have well-known constructions. The valve devices 4a and 4b take anyone of three positions A, B or C in accordance with the current intensities of the control signals Sa and Sb.

When the control signals Sa and Sb are "0" in current level, the valve devices 4a and 4b take the first positions A for increasing the brake pressure to the brake for the wheel, respectively. In the first position A, the master cylinder side and the wheel cylinder side are connected. When the control signals Sa and Sb are "½" in current level, the valve devices 4a and 4b take the second positions B to maintaining the brake pressure to the brake constant. In the second position B, the connections between the master cylinder side and the wheel cylinder side and between the wheel cylinder side and the reservoir side are interrupted. When the control signals Sa and Sb are "1" in current level, the valve devices 4a and 4b take the third positions C to decrease the brake pressure to the brake respectively In the third position C, the connection between the master cylinder side and the wheel cylinder side is interrupted, while the connection between the wheel cylinder side and the reservoir side is made. The brake fluid is discharged through the conduits 60a, 60b and 27 into the reservoir 25 from the wheel cylinders 7a, 7b.

When any one of the control signals Sa and Sb becomes "1", the drive signal is generated, and it is maintained during skid control operation. The drive signal is supplied to the motor 22. The control unit 31 further generates valve drive signal Pa and Pb for the check valve devices 26a and 26b. The motor 22 is also driven during the drive slip control.

Figure 2:
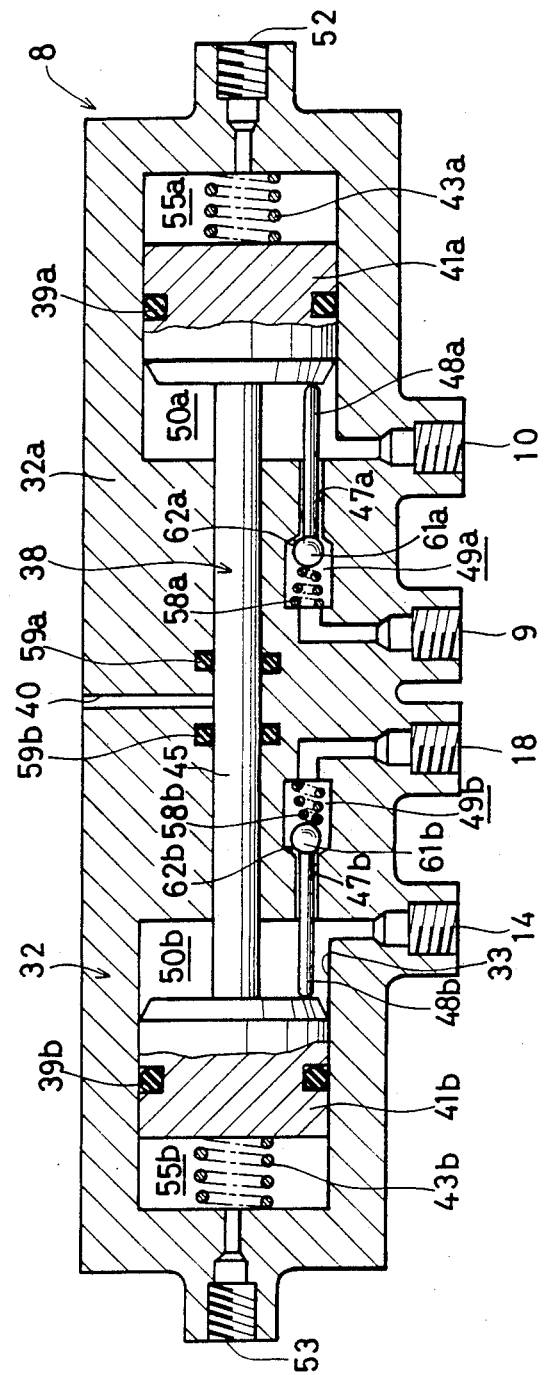
FIG. 2 is an enlarged cross-sectional view of pressure selecting apparatus in FIG. 1.

Next, the details of the apparatus 8 will be described with reference to FIG. 2. In FIG. 2, an axial through hole 33 that is stopped is made in a casing 32 for the apparatus 8. A piston group 38 consisting of three members is slidably fitted into the stepped hole 33. The three members are a pair of larger-diameter pistons 41a and 41b and a smaller-diameter piston 45. The larger-diameter pistons 41a and 41b are provided with seal rings 39a and 39b. Output chambers 50a and 50b are formed at the insides of the larger-diameter pistons 41a and 41b. Master cylinder pressure chambers 55a and 55b are formed at the outsides of the larger-diameter pistons 41a and 41b. The smaller-diameter piston 45 is slidably fitted to a central hole of a partition 32a of the casing 32, sealed with seal rings 59a and 59b. A space between the seal rings 59a and 59b communicates through a vent 40 with the atmosphere. The larger-diameter pistons 41a and 41b are urged inward by springs 43a and 43b which are equal to each other in spring force. Thus, the piston group 38 is normally located at the neutral position shown in FIG. 2.

The master cylinder pressure chambers 55a and 55b and the output chambers 50a and 50b communicate with conduits 42a and 42b, 13 and 15 through connecting ports 52 and 53, and output ports 10a and 14b, respectively.

Valve rods 48a and 48b are slidably fitted to axial holes 47a and 47b made in the partition 32a of the casing 32. Outer ends of the valve rods 48a and 48b contact the inner surfaces of the larger-diameter pistons 41a and 41b. Their inner end, contact with valve balls 61a and 61b springs 58a and 58b. When the piston group 38 is located at the neutral position shown, the valve balls 61a and 61b are separated from valve seats 62a and 62b, as shown in FIG. 2. Valve chambers 49a and 49b in which the springs 58a and 58b are compressed communicate with the conduits 5a and 17a through input ports 9 and 18, respectively.

In FIG. 1, check valves 19a and 19b are connected in parallel with the electromagnetic valve devices 4a and 4b. They permit brake fluid to flow through then only in the direction from the wheel cylinder side toward the master cylinder side. Both sides of the valve devices 4a and 4b are connected with through throttling holes in the A-positions. Accordingly, pressurized fluid is rapidly returned through the check valves 19a and 19b to the master cylinder 1 from the wheel cylinders 7a, 7b, 12a and 12b, when the brake is released.

When the brake pedal 2 is released from treading in the B or C-positions of the valve devices 4a and 4b during skid control, the brake fluid can be returned from the wheel cylinder side to the master cylinder side through the check valves 19a and 19b.

The first and second output ports 10, 14 of the apparatus 8 are connected to the wheel cylinders 12a, 12b of the rear wheels 11a, 11b through the proportioning valves 51a, 51b. The proportioning valves 51a, 51b are of well-known construction. When the pressurized fluid pressure of the input port side becomes larger than a predetermined value, the proportioning valves 51a, 51b transmit to the output side the pressurized fluid decreased proportionally at a predetermined ratio.

When the drive signals Pa and Pb are supplied to the solenoid portions 64a and 64b of the check valve devices 26a and 26b, the latter take the positions E in which they function as check valves which permit fluid to flow from the master cylinder side toward the side of the changeover valve 4a or 4b. The check valve devices 26a and 26b are normally in position D in which both sides are made to freely communicate with each other when the solenoid portion 64a and 64 b are not energized by the drive signals Pa and Pb.

According to this embodiment, when the control signals Sa and Sb from the control unit 31 are at levels other than "1" during the anti-skid control, namely when the control signals Sa and Sb are other than signals for the brake relieving, or when the driving slip control or traction control is effected, the drive signals Pa and Pb become "1".

Check valves 65a and 65b as relief valves are connected between the discharging side of the fluid pressure pumps 20a and 20b and the conduit 27, and they permit fluid to flow from the discharging side of the fluid pressure pumps 20a 20b towards the conduit 27.

Figure 3:
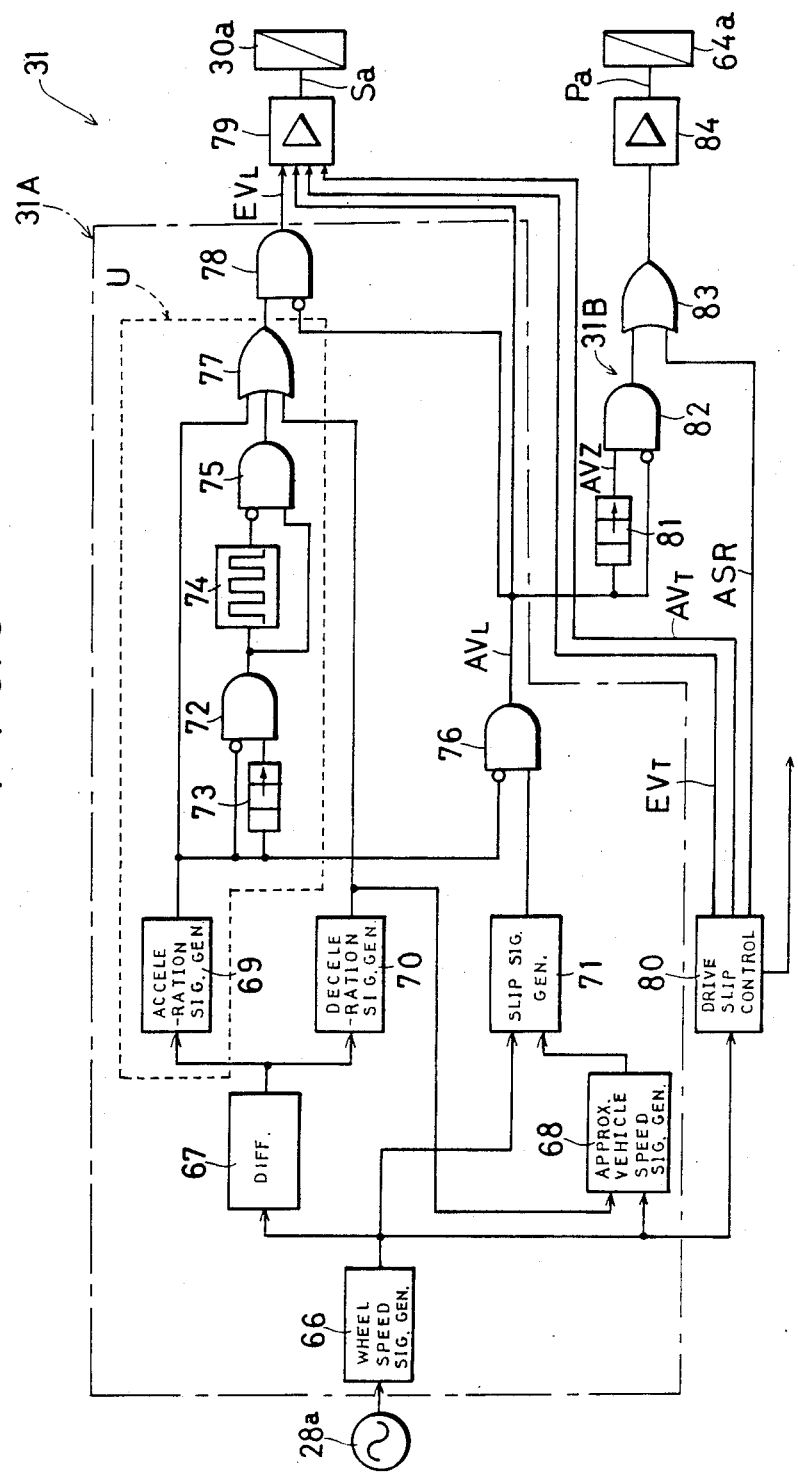
FIG. 3 is a circuit diagram of a control unit in FIG. 1.

Next, there will be described the details of the control unit 31 with reference to FIG. 3 In FIG. 3, only a control circuit for the right front wheel 6a is shown. It consists of an anti-skid control part 31A and a drive slip or traction control part 31B. Control circuits for the other wheels 6b, 11a and 11b are constructed in the same manner as shown in FIG. 2. According to this embodiment, the drive wheels of the vehicle are the front wheels 6a and 6b. Accordingly, the drive slip control circuits are not provided for the rear wheels 11a and 11b. In FIG. 3, the anti-skid control circuit 31A is surrounded by the dash-lines. Reference numeral 31B represents the drive slip control circuit for the right front wheel 6a.

First, the anti-skid control circuit 31A will be described.

The signal from the wheel speed sensor 28a is supplied to a wheel speed signal generator 66. Digital or analogue output proportional to the wheel speed is obtained from the wheel speed signal generator 66, and it is supplied to an approximate vehicle or body speed signal generator 68 and a slip signal generator 71 and a differentiator 67.

The approximate vehicle speed signal generator 68 receives the output of the speed signal generator 66. The outputs of the approximate vehicle speed signal generator 68 is equal to the output of the wheel speed signal generator 66, until the deceleration of the wheel reaches a predetermined value. After it becomes higher than the predetermined value, the output of the approximate vehicle speed signal generator 68 decreases at a predetermined gradient with time. The initial output is equal to the output at the time when the deceleration of the wheel has reached the predetermined value. The output of the approximate vehicle speed signal generator 68 is supplied to the slip signal generator 71 to be compared with the output of the wheel speed signal generator 66. A predetermined reference ratio or amount is set in the respective slip signal generator 71.

The reference ratio or amount is for example, 0.15 (15%).

Generally, a slip ratio S of the wheel is given by the following formula:

$$S = 1 - \frac{\text{Wheel speed } (V, V')}{\text{Vehicle speed } (E)}$$

When (1−V,V') is larger than the reference ratio, E a slip signal S is generated from the slip signal generator 71, namely the output of the slip signal generator 71, becomes a higher level "1" of the two levels "1" and "0".

The differentiator 67 receives the outputs of the wheel speed signal generators 66, and differentiates it with respect to time. The output of the differentiator 67 is supplied to a deceleration signal generator 70, and to an acceleration signal generator 69. A predetermined threshold deceleration (for example, −1.5g) is set in the deceleration signal generator 70, and it is compared with the output of the differentiator 67. A predetermined threshold acceleration (for example, 0.5g) is set in the acceleration signal generator 69 and it is compared with the output of the differentiator 67. When the deceleration of the wheel becomes larger than the predetermined threshold deceleration (−1.5g), a deceleration signal −b is generated from the deceleration signal generator 70. When the acceleration of the wheel becomes larger than the predetermined threshold acceleration (0.5g), an acceleration signal +b is generated from the acceleration signal generator 69.

An output terminal of the acceleration signal generator 69 is connected to a negation input terminal (indicated by circle o) of AND gate 72, a negation input terminal of an AND gate 76, OFF delay timer 73, and a first input terminal of an OR gate 77. The output terminal of the OFF delay timer 73 is connected to an input terminal of the AND gate 72. An output terminal of the AND gate 72 is connected to an input terminal of a pulse generator 74, and an input terminal of an AND gate 75. An output terminal of the pulse generator 74 is connected to a negation input terminal of the AND gate 75. A stepwise brake-increasing signal generator U is constituted by the acceleration signal generator 69, the OFF delay timer 73, the pulse generator 74, the OR gate 75, and the AND gates 72 and 75 and it generates pulse signals to slowly increase the brake pressure for the delay time of the OFF delay timer 73.

An output terminal of the AND gate 75 is connected to a second input terminal of the OR gate 77.

An output terminal of the deceleration signal generator 70 is connected to a third input terminal of the OR gate 77 and to an input terminal of the approximate vehicle speed signal generator 68. An output terminal of the slip signal generator 71 is connected to another input terminal of the AND gate 76. An output terminal of the AND gate 76 is connected to a negation input terminal of an AND gate 78, and an output terminal of the OR gate 77 is connected to another input terminal of the AND gate 78.

The outputs $EV_L$ and $AV_L$ of the AND gates 78 and 76 are current-controlled and amplified by a current-controller/amplifier 79, and supplied to the solenoid portion 30a of the change-over valve 4a in FIG. 1. The outputs $EV_L$ and $AV_L$ are equal to the control signal Sa of the current level "½" or "1". Although not shown, an anti-skid control part for the other front wheel 6b is constructed in the same manner as shown in FIG. 3.

Outputs from one of the rear wheels 11a, 11b are supplied to the solenoid portion 30a of the change-over valve 4a, while outputs from the other rear wheel 11a or 11b are supplied to the solenoid portion 30b of the other change-over valve 4b. Outputs from the other front wheel 6b are supplied to the solenoid portion 30b of the other change-over valve 4b.

Next, there will be described the drive slip control part 31B. A drive slip control circuit 80 receives the output of the wheel speed signal generator 66 and compares it with a reference acceleration value and reference slip value set in the circuit 80. With that comparison, whether or not the front wheel 6a as the drive wheel on drive slips extraordinarily on acceleration is judged. When the front wheel 6a slips extraordinarily while driving, a control signal $EV_T$ or $AV_T$ is generated from the circuit 80. During the drive slip control, the circuit 80 generates the drive slip signal ASR.

The control signals $EV_T$ and $AV_T$ are supplied to the current-controller/amplifier 79 and the output thereof is supplied to the solenoid portion 30a of the change-over valve 4a as the control signal Sa of the current level "½" or "1".

The drive slip signal ASR is supplied to one input terminal of the OR gate 83 and an output terminal of an AND gate 82 is connected to another input terminal of the OR gate 83. An output terminal of an OFF delay timer 81 receiving the above signal $AV_L$ is connected to one input terminal of the AND gate 82. The signal $AV_L$ is directly supplied to another negation input terminal of the AND gate 82.

The delay time T of the OFF delay timer 81 is sufficiently long and so that the output AVZ continues during anti-skid control. The output AVZ and the output ASR of the drive slip control circuit 80 are supplied to a motor drive circuit which is not shown. Accordingly, the drive signal Q for driving the motor 22 in FIG. 1 is generated from the motor drive circuit. The output of the OR gate 83 is amplified by an amplifier 84, producing to the drive signal Pa.

Although the drive slip control part 31B for the right front wheel 6a has been described, a drive slip control circuit for the other front wheel 6b is constructed in the same manner. It generates the control signal Sb, drive signal Pb and motor drive signal Q. They are supplied to the solenoid portion 30b of the other changeover valve 4b, the solenoid portion 64b of the check valve device 26b and the motor 22, respectively.

Next, there will be described operations of the above described anti-skid apparatus.

It is now assumed that both of the conduit systems are in order, and a wheels 6a, 6b, 11a and 11b run on the road which is uniform in frictional coefficient.

The vehicle driver treads the brake pedal 2. At the beginning of the braking, the control signals Sa and Sb are "0" from the control unit 31. Accordingly, the valve devices 4a and 4b are in the A-position. Pressurized fluid is supplied from the master cylinder 1 to the wheel cylinders 7a and 7b of the front wheels 6a and 6b through the conduits 3, 16, the check valve devices 26a, 26b, the valves 4a, 4b and the conduits 5, 17. Further, it is supplied to the wheel cylinders 12a and 12b of the rear wheels 11a and 11b through the first and second input ports 9, 18, the output chambers 50a, 50b, the first and second output ports 10, 14 in the apparatus 8, the conduits 13 and 15 and the proportioning valves 51a and 51b. Thus, the wheels 6a, 6b, 11a and 11b are braked.

The fluid pressures of the fluid pressure generating chambers of the master cylinder 1 rise at substantially the same rate. Accordingly, the pressures of the master cylinder pressure chambers 55a and 55b are substantially equal to each other in the apparatus 8. Further, the pressures of the output chambers 50a and 50b, and therefore the valve chambers 49a and 49b, when the valve balls 61a and 61b are separated from the valve seats 62a and 62b, are substantially equal to each other. Accordingly, the piston group 38 is not moved, and remains positioned at the shown neutral position shown. With the increase of the brake fluid pressure, when the deceleration of the wheels 6a, 6b, 11a and 11b becomes lower than the predetermined deceleration, the control signals Sa and Sb take the middle level "½". The valves 4a and 4b take the second position B. The conduits 3, 16 are disconnected from the conduits 5, 17. Further, the conduits 5, 17 are interrupted from the conduits 60a, 60b. Thus the brake fluid pressures of the wheel cylinders 7a, 7b, 12a and 12b are maintained constant.

When the slip ratio of the wheels 6a, 6b, 11a and 11b becomes higher than the predetermined slip ratio, the control signals Sa and Sb take the high level "1". The solenoid portions 30a and 30b are energized. The valves 4a and 4b take the third position C. The conduits 3 and 16 are disconnected from the conduits 5 and 17, respectively. However, the conduits 5 and 17 are connected to the conduits 60a and 60b. The pressurized fluid is discharged from the wheel cylinders 7a and 7b of the front wheels 6a and 6b into the hydraulic reservoir 25 through the conduits 60a, 27, and 60b, 27. The pressurized fluid from the wheel cylinders 12a and 12b of the rear wheels 11a and 11b is discharged through the conduits 15, 13, the output ports 14, 10, the output chambers 50a, 50b, the valve chambers 49a, 49b, the input ports 18, 9 in the apparatus 8, and the conduits 17a, 5a, 60a and 60b, into the hydraulic reservoir 25. Thus, the brakes of the wheels 6a, 6b, 11a and 11b are relieved.

In FIG. 3, the output of the slip signal generator 71 becomes "1", when the slip ratio of the wheel becomes higher than the predetermined value. Thus, the output $AV_L$ is generated. It is supplied through the OFF delay timer 81 to the one input terminal of the AND gate 82. The output AVZ is generated from the timer 81, and so the fluid pressure pumps 20a and 20b start to be driven in FIG. 1. To facilitate the description, only the circuit for the one front wheel will be described. The following description holds true of the other front wheel.

The brake fluid discharged into the reservoir 25 is immediately pumped by the fluid pressure pumps 20a and 20b. In FIG. 3, the input to the one input terminal of the AND gate 82 becomes "1". However, the input to the other input terminal is negated. Accordingly, the output of the OR gate 83 is still "O". Thus, the drive signals Pa and Pb are not generated. The solenoid portions 64a and 64b of the check valve devices 26a, 26b are not energized. Thus, the check valve devices 26a, 26b remain at the position D. As above described, when the deceleration signal has been generated, the brake fluid pressure is maintained constant. Thus, the negation input to the AND gate 82 is "1". The drive signals Pa and Pb are not generated for the check valve devices 26a and 26b. The initial brake relieving signal $AV_L$ is not yet generated, and the output of OFF delay timer 81 is still "O". The wheels are, then, not judged to be in the course of the anti-skid control. After the initial brake relieving signal $AV_L$ has been generated, the wheels are judged to be in the course of the anti-skid control. The output of the OFF delay timer 81 continues to be generated.

The discharging brake fluid of the fluid pressure pumps 20a and 20b is returned into the master cylinder 1 through the check valve devices 26a and 26b. Thus, the stroke of the brake pedal 2 is decreased.

Figure 4:
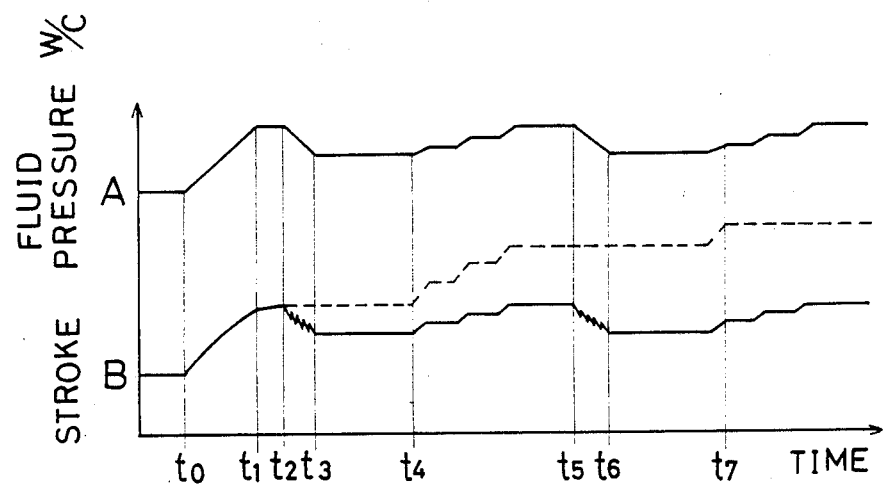
FIG. 4 is a set of graphs explaining operation of the first embodiment.

Next, such operations will be described with reference to FIG. 4.

It is assumed that the brake pedal 2 is trodden at time t0. The fluid pressure of the wheel cylinder increases as shown in FIG. 4. The stroke of the brake pedal 2 increases, accordingly as shown in FIG. 4. When the deceleration signal is generated at time t1 as above described, the fluid pressure of the wheel cylinder is maintained at constant. On the other hand, the stroke of the brake pedal 2 increases at smaller gradient.

When the brake relieving signal is generated at the time t2, the fluid pressure of the wheel cylinder decreases as above described. Then, the check valve devices 26a and 26b take the position D. Accordingly, the brake fluid sucked from the reservoir 25 by the fluid pressure pumps 20a and 20b is supplied to the master cylinder 1. Accordingly, the brake pedal 2 is pushed back backwards. And so the stroke of the brake pedal 2 decreases as shown in FIG. 4. Since the motor 22 starts to be driven at time t2, the discharge pressure of the fluid pressure pump is increased from zero at time t2, and it becomes equal to the master cylinder pressure at a certain time. Before that time, the stroke of the brake pedal 2 slowly increases and then after the discharging pressure of the fluid pressure pump 20a, 20b becomes higher than the master cylinder pressure, the stroke of the brake pedal 2 decreases rapidly. The discharging pressures of the fluid pressure pumps 20a and 20b exhibit ripples as shown in FIG. 4B.

Next, when the acceleration signal +b is generated at time t3, the output $EV_L$ is generated and the levels of the control signals Sa and Sb become "½". Accordingly, the brake fluid pressure is maintained at constant as shown in FIG. 4A. At that time, the output of the OFF delay timer 81 is already "1" in FIG. 3. Accordingly, with the dissipation of the output signal $AV_L$, the output of the AND gate 82 and therefore that of the OR gate 83 becomes "1" and so the drive signals Pa and Pb are generated. The check valve devices 26a and 26b take the position E in FIG. 1. The fluid is prohibited from flowing to the master cylinder side. Accordingly, although the fluid pressure pumps 20a and 20b continue to be driven, the brake fluid is not supplied to the master cylinder 1 and so the stroke of the brake pedal 2 is held at constant. At that time, the high fluid pressures of the fluid pressure pumps 20a, 20b are applied to the input ports of the change-over valves 4a and 4b and the check valve devices 26a and 26b. When they become higher than a predetermined value, the check valves 65a and 65b as relief valves are opened and the discharging brake fluid from the fluid pressure pumps 20a and 20b is relieved into the reservoir 25. Accordingly, the input ports of the change-over valves 4a and 4b and the check valve devices 26a and 26b are protected from damage.

When the acceleration signal +b disappears at time t4, the output of the AND gate 72 in FIG. 3 becomes "1". Accordingly, the pulse generator 74 is driven for the delay time of the OFF delay timer 73 and so the output $EV_L$ changes by pulses. The fluid pressure of the wheel changes by pulses. The fluid pressure of the wheel cylinder increases stepwise but slowly as shown in FIG. 4A. At that time, the check valve devices 26a and 26b take the position E. However, the check valve devices 26a and 26b permit the brake fluid to flow from the master cylinder side. The fluid pressure is supplied to the wheel cylinder side through the check valve devices 26a and 26b and changover valves 4a and 4b also from the master cylinder 1. Accordingly, the stroke of the brake pedal 2 increases stepwise as shown in FIG. 4B.

When the brake relieving signal is generated at time t5, the output of the AND gate 82 in FIG. 3 becomes "0", and so the signals Pa and Pb disappear. The check valve devices 26a and 26b are changed over again into the position D. The fluid pressure of the wheel cylinder decreases as shown in FIG. 4A. However, the discharging fluid of the fluid pressure pump 20a and 20b is returned into the master cylinder 1, and so the stroke of the brake pedal 2 is decreased as shown in FIG. 4B.

When the acceleration signal +b is generated at time t6, the output $EV_L$ is generated and so the fluid pressure of the wheel cylinder is held constant. However, since the output $AV_L$ disappears, the output of the AND gate 82 becomes "1". Accordingly, the drive signals Pa and Pb are generated to change over the check valve devices 26a and 26b into the position D.

Thus, the stroke of the brake pedal 2 is maintained at constant as shown in FIG. 4B. Hereinafter, the above operations or controls are repeated. When the vehicle has decelerated to the desired speed or stops, the brake pedal 2 is released from treading. Accordingly, brake fluid from the wheel cylinders 7a, 7b, 12a and 12b is returned through the conduits, the apparatus, the change-over valves 4a, 4b, the check valves 19a, 19b and the check valve devices 26a and 26b into the master cylinder 1. Thus, the brake is relieved.

If the check valve devices 26a and 26b were changed over into the position E all or almost all through the time of the anti-skid control operation, all of the brake fluid for brake relieving would be discharged into the reservoir 25 and so the stroke of the brake pedal 2 would be lengthened more as shown by the dashed line in FIG. 4B. At last, the stroke of the brake pedal might reach the full distance, for example, at time t7. At that time, the driver would feel concern that the brake conduit might fail. Further, pressurized fluid could not be supplied from the master cylinder after time t7. It could be supplied only to the fluid pressure pumps 20a, 20b. The supply rate would be reduced much and the braking force would be insufficient.

In the above description, the control signals Sa and Sb become "0", "1" or "½" at the same time. However, when the frictional coefficients of the road are considerably different at the right and left sides, the control signals Sa and Sb do not become "0", "1", or "½" at the same time. For example, when the frictional coefficient of the right side of the road is relatively small, the control signal Sa first becomes "1". Such a case will now be described.

The operations at the beginning of the braking are the same as described above. When the control signal Sa becomes "1", the valve 4a takes the position C. Pressurized fluid is discharged into the reservoir 25 from the wheel cylinders 7a and 12b.

In the apparatus 8, the fluid pressure is decreased in the valve chamber 49a and output chamber 50a at the right side of the piston group 38. On the other hand, the brake fluid continues to be supplied to the wheel cylinders 7b and 12a from the master cylinder 1. Accordingly, the leftward pushing force to the piston group 38 becomes larger. The piston group 38 is moved to the left. Thus, the left valve ball 61b seats on the valve seat 62b by spring action of the spring 58b. On the other hand, the right valve ball 61a is further separated from the valve seat 62a by the rod portion 48a. The right valve chamber 49a remains connected to the right output chamber 50a, while the left valve chamber 49b is is disconnected from the left output chamber 50b. Thus, the fluid supply to the wheel cylinder 12a of the one rear wheel 11a is disconnected from the master cylinder 1.

When the piston group 38 is further moved leftwards with the decrease of the fluid pressure of the right valve and output chambers 49a and 50a, the volume of the left output chamber 50b interrupted from the right valve chamber 49b is increased. In other words, the fluid pressure of the wheel cylinder 12a of the rear wheel 11a is lowered since the wheel cylinder 12a communicates with the left output chamber 50b through the output port 14 and conduit 15.

When the control signal Sa again becomes again "0" to increase the fluid pressure of the valve and output chambers 49a and 50a, the piston group 38 is moved rightwards to decrease the volume of the left output chamber 50b, while the left valve ball 61b seats on the valve seat 62b. Thus, the brake fluid pressure of the wheel cylinder 12a of the rear wheel 11a is again increased. The above-described operation means that the brake fluid pressure of the wheel cylinder 12a of the rear wheel 11a at the same side as the front wheel 6a is controlled in accordance with the brake fluid pressure of the wheel cylinder 7a of the front wheel 6a. Thus, the rear wheel 11a running on the lower frictional coefficient side of the road is prevented from locking, similarly to the front wheel 6a at the same side. If the brake fluid pressure of the wheel cylinder 12a of the rear wheel 11a is controlled in common with the brake fluid pressure of the wheel cylinder 7b of the front wheel 6b running on the higher frictional coefficient side, the rear wheel 11a would be locked.

In the above description, the first brake relieving signal $AV_L$ is generated from the right front wheel 6a, and so the anti-skid control starts. The check valve device 26a remains at the position D. The brake fluid discharged from the fluid pressure pump 20a is returned to the master cylinder 1. The pedal stroke is decreased in the same manner as described above. When the brake is reapplied or is held, the drive signal Pa is generated, and the check valve device 26a is changed over to the position E. The fluid pressure of the wheel cylinder is increase slowly or in steps, or it is held constant. The pedal stroke is increased in steps or it is held constant, in accordance with the fluid pressure of the wheel cylinder.

Next, there will be described the case that one of the two conduit systems fails. For example, when brake fluid leaks from the one conduit system including the conduit 3, the fluid pressures of the wheel cylinders 7a and 12b are not increased by treading the brake pedal 2. On the other hand, the fluid pressure of the other conduit system including the conduit 16 increased by treading the brake pedal 2. Accordingly in the apparatus 8, the fluid pressure of the one master cylinder pressure chamber 55b rises, while that of the other master cylinder pressure chamber 55a remains zero. Thus, the fluid pressures to both sides of the one larger-diameter piston 41a are zero. Those to both sides of the other larger-diameter piston 41b are not zero, and are substantially equal to each other. As a result, the piston group 38 is not moved, and remains located at the shown neutral position. Accordingly, the valve ball 61b remains separated from the valve seat 62b.

Thus, in the right conduit system, the pressurized fluid is supplied from the master cylinder 1 into the wheel cylinder 7b of the left front wheel 6b through the conduits 16, 16a, the valve 4b and the conduit 17. Further, it is supplied from the master cylinder 1 into the wheel cylinder 12a of the right rear wheel 11a through the conduit 17a, the valve chamber 49b of the apparatus 8, the output chamber 50b thereof (the valve ball 61b opened), and the conduit 15. Thus, the braking force can be securely obtained in the one conduit system.

When the valve 4b is changed over into the position B or C with the tendency of the locking of the front or rear wheel 6b or 11a, the fluid pressure of the valve and output chambers 49b and 50b becomes lower than that of the master cylinder pressure chamber 55b, in the apparatus 8, and so the piston group 38 is moved rightwards with the fluid pressure difference between both sides of the larger diameter piston 41b. Accordingly, the valve ball 61b is moved further rightwards and separated even more from the valve seat 62b. The valve ball 61b remains separated.

When the valve 4b is changed over into the position B, the wheel cylinders 7b and 12a of the wheels 6b and 11a are disconnected both from the master cylinder and from the reservoir 25, so that the fluid pressure of the wheel cylinders 7b and 12a increases with the rightward movement of the piston group 38, since the volume of the valve and output chambers 49b and 50b decreases therewith.

When the valve 4b is changed over into the position C, the wheel cylinders 7b and 12a of the wheels 6b and 11a are disconnected from the master cylinder side, but are connected to the reservoir side. Thus, the braking forces of the front and rear wheels 6b and 11a are decreased, so that the wheels are prevented from locking.

As described above, the braking force can be securely obtained in the one right conduit system, even when the other conduit system fails.

In the first embodiment, when the brake fluid pressure is decreased, or when the brake relieving signal is generated, brake fluid is continuously returned into the master cylinder 1 to generate the brake relieving signal and so the stroke of the brake pedal 2 is decreased as shown in FIG. 4B. Instead of such a control method, a circuit shown in FIG. 5 may be used for decreasing the pedal stroke in steps.

In the first embodiment, the output $AV_L$ is directly supplied to the negation input terminal of the AND gate 82. However, in the circuit of FIG. 5, the output $AV_L$ is supplied through a pulse generator 85 to the negation input terminal of the AND gate 82. Accordingly, for example, when the output $AV_L$ is generated from the right front wheel 6a, the output of the AND gate 82 changes in pulses and so the drive signal Pa is pulsed and the check valve device 26a is changed over alternately to the positions D and E. Accordingly, the stroke of the brake pedal 2 decreases in steps as shown in FIG. 6B. The fluid pressure of the wheel cylinder changes similarly as shown in FIG. 6A.

In the above first embodiment and above modification, the changeover time or the total of the intermittent changeover time of the check valve devices 26a, 26b is equal to the generating time of the brake relieving signal. Instead, it may be lengthened by a predetermined time, for example, by an OFF delay timer. In that case, the stroke of the brake pedal 2 changes as shown in FIG. 6C or D. Or when the brake pressure is maintained at constant after the initial brake relieving control, the check valve devices 26a and 26b may be changed over during the generation of the brake holding signal or for some portion of the generating time of the brake holding signal. With such a control method, the stroke of the brake pedal 2 can be decreased more than that in the first embodiment. With the above modifications, it that the stroke of the brake pedal 2 can be prevented from unnecessary increase. Further, the pedal stroke can be adjusted in the brake relieving operation. Thus, the driver feels that the brakes are operating The anti-skid control operation has been described. Next, the drive slip control operation will be described.

For example, it is assumed that the right front wheel 6a as the drive wheel slips very much when the vehicle starts In FIG. 3, that fact is detected by the drive slip control circuit 80 which generates the signal ASR. The output of the OR gate 83 becomes "1". The drive signal Pa is generated. In FIG. 1, the check valve device 26a is changed over to the position E. The fluid pressure pump 20a starts to be driven. However, the discharging pressure of the fluid pressure pump 20a is not transmitted to the master cylinder 1, but the fluid pressure is supplied to the front wheel 6a through the change-over valve 4a. Thus, the wheel 6a is braked. On the other hand, the drive slip control circuit 80a generates the control signal $EV_T$ or $AV_T$. The control signal Sa of the level "$\frac{1}{2}$" or "1" is accordingly generated from the control unit 31. Thus, the holding control and the relieving control are repeatedly effected and so the drive slip is stably controlled. The drive slip of the drive wheel is reduced to the minimum. When the fluid pressure pumps 20a, 20b are driven by the single electric motor, the changeover valve 4b is changed to the position B for the left front wheel 6b which does not require drive slip control. As a result, the left front wheel 6b is not braked. Further, the check valve device 26b is changed over to the position E, at which the controlled fluid pressure of the wheel cylinder 7a of the front wheel 6a is applied to the output chamber 50a of the apparatus 8 and the larger diameter piston 41a recieves the pressure. However, the pressure of the master cylinder pressure chamber 55a, 55b and the other output chamber 50b are zero. Accordingly, the right valve ball 61a is closed. Thus, a brake fluid pressure is not supplied to the wheel cylinder 12b of the left rear wheel 11a of the same conduit system.

When both of the front wheels 6a and 6b as drive wheels exhibit much slip, the check valve devices 26a and 26b are changed over into the position E and both of the fluid pressure control valves 4a and 4b are controlled. Accordingly, the drive slips of the front wheels 6a and 6b are controlled stably approaching the optimum value. At that time, the controlled fluid pressure of the wheel cylinders 7a and 7b of the front wheels 6a and 6b are supplied to the output chamber 50a, 50b of the apparatus 8. Accordingly, the larger diameter pistons 41a and 41b experience equal forces in opposite directions as do the master cylinder pressure chambers 55a and 55b, because the pressure of the master cylinder 1 is zero, the valve balls 61a and 61b are closed. Accordingly, both of the rear wheels 11a and 11b as the nondrive wheels are not braked.

Figure 7:
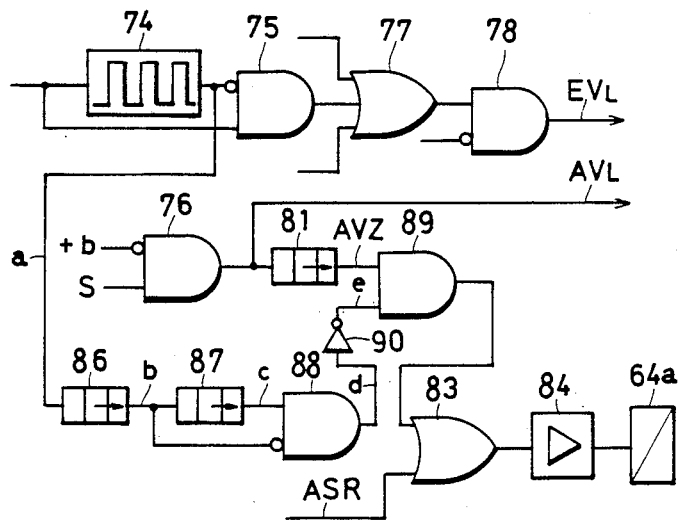
FIG. 7 is a circuit diagram of an important part of a control unit according to a second embodiment of this invention.

FIG. 7 shows the second embodiment of this invention. The conduit system is the same as that of the first embodiment. The different portions of the control unit 31 are shown in FIG. 7 and the parts in FIG. 7 which correspond to those in FIG. 3 are denoted by the same reference numerals.

In FIG. 7, the output of the pulse generator 74 is supplied to a first OFF delay timer 86. The output of the timer 86 is supplied to one input terminal of an AND gate 88 through a second OFF delay timer 87 and it is directly supplied to a negation input terminal of the AND gate 88. An output terminal of the AND gate 88 is connected to one input terminal of an AND gate 89 through an inverter 90. The output $AV_L$ is supplied through an OFF delay timer 81 to another input terminal of the AND gate 89. An output terminal of the AND gate 89 is connected to the one input terminal of the OR gate 83 as in the same manner as in the first embodiment.

Figure 8:
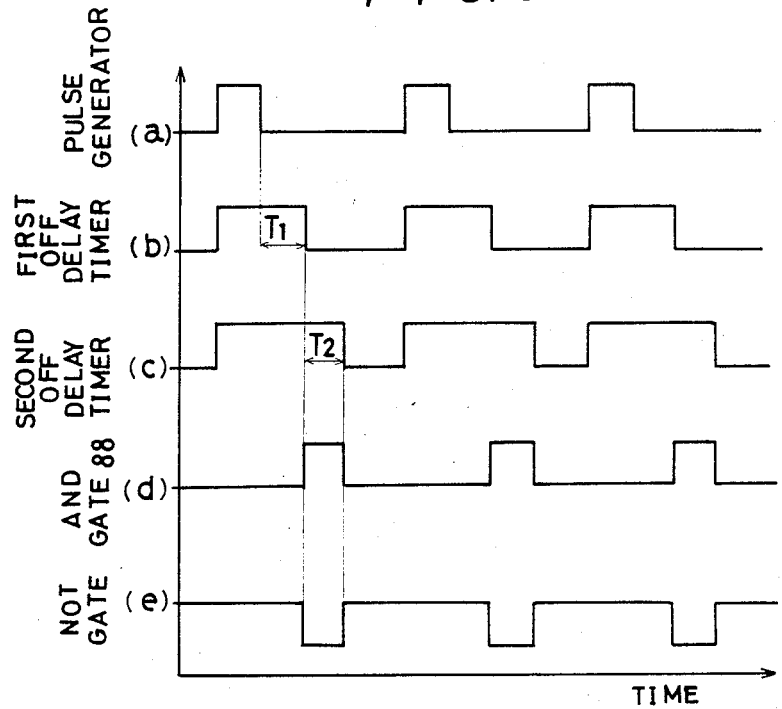
FIG. 8 is a set of time charts explaining operations of the second embodiment.

The outputs of the pulse generator 74, first and second OFF delay timers 86, 87, AND gate 88 and inverter 90 are denoted as a, b, c, d and e as shown in FIG. 7, respectively. The time relationships among them are shown in FIG. 8. As described with respect to the first embodiment, the fluid pressure is increased in steps by the pulse output a of the pulse generator 74. The pulse width is lengthened by the delay time T1 of the first OFF delay timer 86 and further it is lengthened by the delay time T2 of the second OFF delay timer 87. From the above relationships, the pulse width of the output d of the AND gate 88 is equal to T2.

Figure 9:
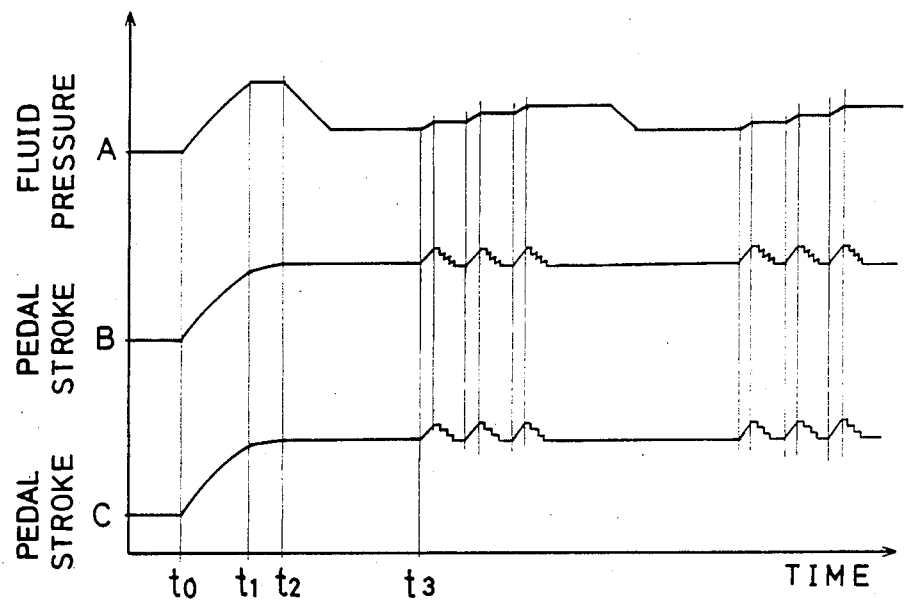
FIG. 9 is a set of graphs for explaining operations of the second embodiment.

In the conduit system of FIG. 1, the brake pedal 2 is trodden and the anti-skid control is effected. Accordingly, the fluid pressure P of the wheel cylinder changes as shown in FIG. 9A. When the brake pedal 2 is trodden at time t0, the fluid pressure P increases as shown in FIG. 9A and the stroke of the brake pedal 2 increases as shown in FIG. 9B. When the brake holding signal is generated at time t1, the fluid pressure P is held constant and the stroke of the brake pedal 2 increases at a smaller rate. When the brake relieving signal is generated at time t2, in FIG. 7, the output AVZ is generated from the OFF delay timer 81 and it is supplied to the one input terminal of the AND gate 89. Since the output of the inverter 90 is then "1", the output of the AND gate 89 becomes "1" and so the drive signals Pa and Pb are generated. It is here assumed that both of the front wheels 6a, 6b are in the same skid condition.

Accordingly, the fluid pressure P is decreased as shown in FIG. 9A and the check valve devices 26a and 26b are changed over into the position E. The stroke of the brake pedal 2 is held constant. Strictly speaking, the discharge pressure of the fluid pressure pumps 20a and 20b starts to increase from zero at time t2. After a given time, it equal the master cylinder pressure and thus the stroke of the brake pedal 2 is held constant.

When the pulse generator 74 is driven at time t3, the stepwise signal is generated. Accordingly, the fluid pressure P of the wheel cylinder increases in steps as shown in FIG. 9A. The output d as shown in FIG. 8 is generated with output a of the pulse generator 74 from the AND gate 88. Thus, during the generation of this signal, the drive signal Pa and Pb are generated and so the check valve devices 26a and 26b are changed over alternately into the positions D and E with the timing of the pulse d. Accordingly, the stroke of the brake pedal 2 is decreased in steps during the generation of the stepwise brake holding signal as shown in FIG. 9B.

The width of the pulse d and therefore the delay time T2 of the second OFF delay timer 87 may be changed in accordance with the pulse width a in FIG. 8 or the pulse duration time of the pulse generator 74. Or the pulse duration time of the pulse generator 74 may be changed in accordance with the duration time of the previous brake relieving signal or the previous stepwise braking time.

Figure 10:
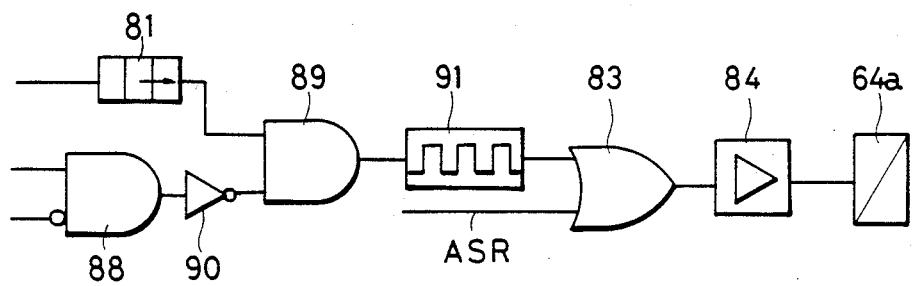
FIG. 10 is a circuit diagram of an important part of a control unit according to one modification of the control unit of the second embodiment.

Further, as one modification of the second embodiment, a second pulse generator 91 may be arranged between the output terminal of the AND gate 89 and the input terminal of the OR gate 83 as shown in FIG. 10. Thus, the stroke of the brake pedal 2 is changed as shown in FIG. 9C.

Also in the second embodiment and the above modification, the driver does not have the uncomfortable feeling when the brake pedal has reached the full stroke. The braking force does not become insufficient. The stroke of the pedal on the reapplication can be adjusted after the first brake decreasing control operation. Thus, the driver feels better.

Also in the second embodiment, the drive slip control can be effected in the same manner as in the first embodiment.

Figure 11:
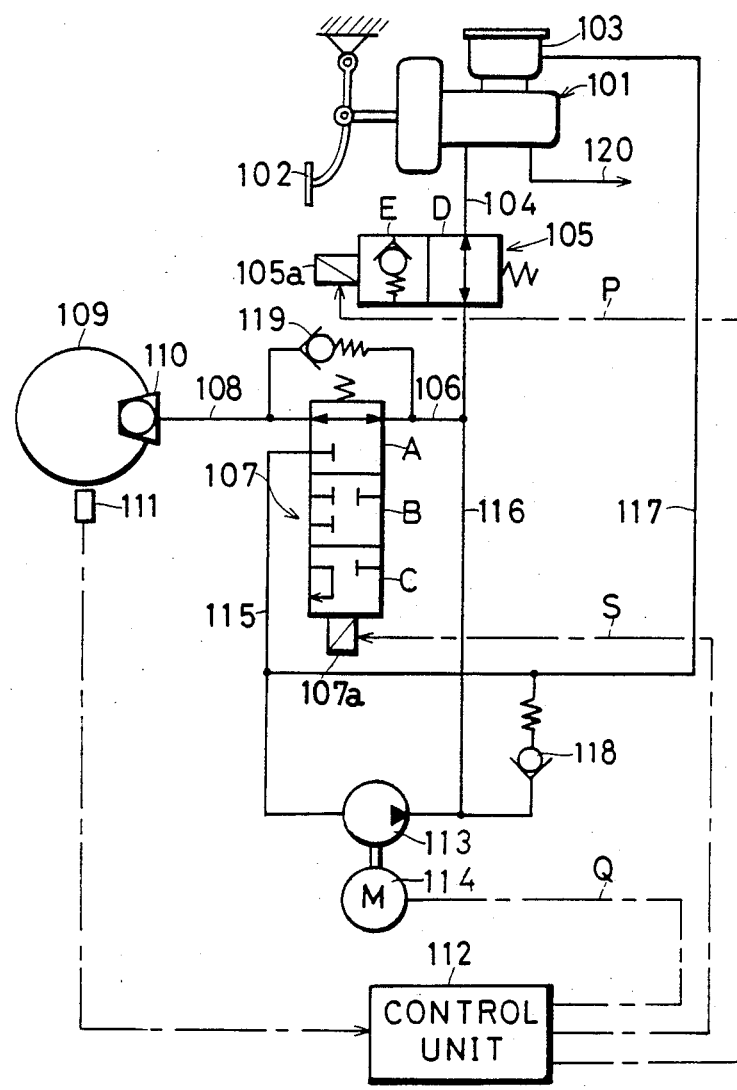
FIG. 11 is a schematic view of a brake fluid pressure control apparatus according to a third embodiment of this invention.

FIG. 11 shows a fluid pressure control apparatus for an anti-skid control apparatus according to a third embodiment of this invention.

In FIG. 11, a brake pedal 102 is connected to a tandem master cylinder 101 which is provided with a hydraulic reservoir 103 which always reserves brake fluid. One fluid pressure generating chamber of the tandem master cylinder 101 is connected to a wheel cylinder 110 of a front wheel 109 through a conduit 104, a check valve device 105, a conduit 106, an electromagnetic three-position valve device 107 and a conduit 108.

Only one of the front wheels is shown in FIG. 11. However, the other front wheel may be connected in parallel with the one front wheel 109. Or another fluid pressure generating chamber may be connected through a conduit 120 and the corresponding parts shown in FIG. 11 to the wheel cylinder of the other front wheel. One of the rear wheels may be connected in parallel with the one front wheel 109. Or the other pressure generating chamber may be connected through the conduit 120 and the corresponding parts shown in FIG. 11, to the one rear wheel or both of the rear wheels.

A discharge opening of the valve device 107 is connected through conduits 115 and 117 to the hydraulic reservoir 103 of the master cylinder 101. A reserving chamber of the reservoir 103 is connected to a suction opening of a fluid pressure pump 113 through the conduit 117.

Although the fluid pressure pump 113 is schematically shown, it consists of a casing, a piston slidably fitted to the casing, an electromotor 114 reciprocating the piston and check valves. A supply opening of the fluid pressure pump 113 is connected through the conduit 116 with the check valve device 105.

A wheel speed sensor 111 is associated with the wheel 109 and it generates pulse signals having frequencies proportional to the rotational speed of the wheel 109. The pulse signals of the wheel speed sensor 111 are supplied to a control unit 112.

A control signal S, motor drive signal Q and drive signal P as the calculation or measurement results are generated from the control unit 31, and are supplied to a solenoid portion 107a of the valve device 107, to the motor 114 and to a solenoid portion 105a of the check valve device 105 respectively. Dashed lines represent electric lead wires.

Although shown schematically, the electromagnetic valve device 107 is of a well-known construction. The valve device 107 takes any one of three positions A, B and C in accordance with the current intensities of the control signal S.

When the control signal S is "0" in current level, the valve device 107 takes the first position A to increase breaking of the wheel. In the first position A, the master cylinder side and the wheel cylinder side are connected. When the control signal is "178" in current level, the valve device 107 takes the second position B for maintaining the brake pressure to the brake constant. In the second position B, the connections between the master cylinder side and the wheel cylinder side, and between the wheel cylinder side and the reservoir side are interrupted. When the control signal S is "1" in current level, the valve device 107 takes the third position C for decreasing the brake pressure to the brake. In the third position C, the connections between the master cylinder side and the wheel cylinder side is interrupted, while the wheel cylinder side and the reservoir side are connected together. The brake fluid is discharged through the conduits 115 and 117 into the reservoir 103 from the wheel cylinder 110.

When the control signal S first becomes "1", the drive signal Q is generated, and it continues during the skid control operation. The drive signal Q is supplied to the motor 114.

A check valve 119 is connected in parallel with the electromagnetic valve device 107. It permits brake fluid to flow only in the direction from the wheel cylinder side towards the master cylinder side. Both sides of the valve device 107 are connected through throttling holes in the A-positions. Accordingly, pressurized fluid is rapidly returned through the check valve 119 to the master cylinder 101 from the wheel cylinder 110 when the brake is released.

When the brake pedal 2 is released from treading in the B or C-position of valve device 107 during the skid control, the brake fluid can be returned from the wheel cylinder side to the master cylinder side through the check valve 119.

When the drive signal P is supplied to the solenoid portion 105a of the check valve device 105, the latter takes the position E in which it functions as a check valve which permits fluid to flow from the master cylinder side toward the side of the change-over valve 107. The check valve device 105 normally takes or, when the solenoid portion 105a is not energized by the drive signal P, the position D in which both sides are connected to each other.

According to this embodiment, when the control signal S from the control unit 112 is at other levels than "1", during the anti-skid control, namely when the control signal S is other than the signal for brake relieving, the drive signal becomes "1".

A check valve 118 as relief valve is connected between the discharge side of the fluid pressure pump 113 and the conduit 117, permitting fluid to flow from the discharge side of the fluid pressure pump 113 toward the conduit 117. For example, the value opening pressure of the check valve 118 is 250kf/cm$^2$.

Next, there will be described the details of the control unit 112 with reference to FIG. 12. Parts in FIG. 12 which correspond to those in FIG. 3 are denoted by the same reference numerals.

The signal from the wheel speed sensor 111 is supplied to a wheel speed signal generator 66. Digital or analogue output proportional to the wheel speed is obtained from the wheel speed signal generator 66 and it is supplied to an approximate vehicle or body speed signal generator 68 and a slip signal generator 71 and a differentiator 67.

The outputs EV and AV of the AND gates 78 and 76 are current-controlled and amplified by a current-controller/amplifier 79, and supplied to the solenoid portion 107a of the changeover valve 107 in FIG. 11. The outputs EV and AV are equal to the control signal of the current level "½" or "1".

An output terminal of an OFF delay timer 81 receiving the above signal AV is connected to one input terminal of an AND gate 82. The signal AV is directly supplied to another negation input terminal of the AND gate 82.

The delay time T of the OFF delay timer 81 is sufficiently long so that the output AVZ continues during the anti-skid control. The output AVZ is supplied to a motor drive circuit which is not shown. Accordingly, the drive signal Q for driving the motor 22 in FIG. 11 is generated from the motor drive circuit. The output of the AND gate 82 is amplified by an amplifier 84 producing drive signal P.

Next, there will be described operations of the above described anti-skid apparatus.

The vehicle driver rapidly treads the brake pedal 102 of FIG. 11. At the beginning of the braking, the control signal S is "0" from the control unit 112. Accordingly, the valve device 107 is in the A-position. Pressurized fluid is supplied from the master cylinder 101 to the wheel cylinder 110 of the front wheel 109 through the conduit 104, the check valve device 105, changeover valve 107 and the conduit 108. Thus, the wheel 109 is braked. With the increase of the brake fluid pressure, when the deceleration of the wheel 109 becomes lower than the predetermined deceleration, the control signal S takes the middle level "½". The valve 107 takes the second position B. The conduit 108 is disconnected from the conduit 106. Further, the conduit 108 is interrupted from the conduit 115. Thus the brake fluid pressure of the wheel cylinder 110 is held constant.

When the slip ratio of the wheel 109 becomes higher than the predetermined slip ratio, the control signal S takes the high level "1". The solenoid portion 107a is energized. The valve 107 takes the third position C. The conduit 108 is not connected to the conduit 106 but is connected to the conduit 115. The pressurized fluid is discharged from the wheel cylinder 110 of the wheel 109 into the hydraulic reservoir 103 through the conduits 115 and 117. Thus, the brake of the wheel 109 is relieved.

Figure 12:
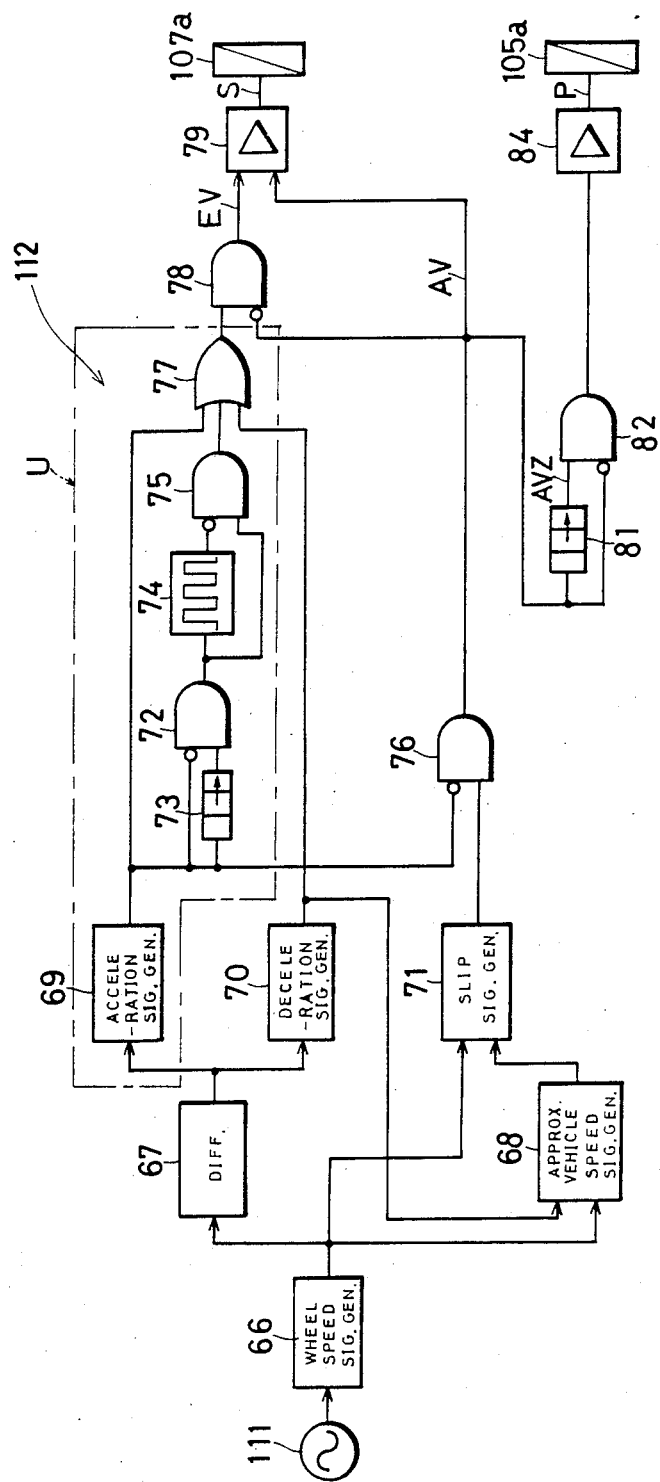
FIG. 12 is a circuit diagram of a control unit in FIG. 11.

In FIG. 12, the output of the slip signal generator 71 becomes "1", when the slip ratio of the wheel becomes higher than the predetermined value. Thus, the output AV is generated and it is supplied through the OFF delay timer 81 to one input terminal of the AND gate 82. The output AVZ is generated from the timer 81, and so the fluid pressure pump 113 of FIG. 11 starts to be driven. The brake fluid discharged into the reservoir 103 is immediately pumped by the fluid pressure pump 113. In FIG. 12, the input to the one input terminal of the AND gate 82 becomes "1". However, the input to the other input terminal is negated. Accordingly, the output of the AND gate 82 is still "0". Thus, the drive signal P is not generated. The solenoid portion 105a of the check valve device 105 is not energized and the check valve device 105 remains at the position D. As above described, when the deceleration signal has been generated, the brake fluid pressure is held constant. Thus, the negation input to the AND gate 82 is "1". The drive signal P is not generated for the check valve device 105 because the initial brake relieving signal AV is not yet generated, and the output of OFF delay timer 81 is still "0". The wheel is, then, not judged to be in the course of the anti-skid control. After the initial brake relieving signal AV has been generated, the wheel is judged to be in the course of the anti-skid control. The output of the OFF delay timer 81 continues to be generated.

The discharging brake fluid of the fluid pressure pump 113 is returned into the master cylinder 101 through the check valve device 105. Thus, the stroke of the brake pedal 102 is decreased.

Next, such operations will be described with reference to FIG. 4, which are similar to those of the first embodiment.

It is assumed that the brake pedal 102 is trodden at time $t_0$. The fluid pressure of the wheel cylinder 110 increases as shown in FIG. 4A. The stroke of the brake pedal 102 increases accordingly as shown in FIG. 4B. When the deceleration signal is generated at time $t_1$, as above described, the fluid pressure of the wheel cylinder 110 is held constant. On the other hand, the stroke of the brake pedal 102 increases at a smaller rate.

When the brake relieving signal is generated at the time $t_2$, the fluid pressure of the wheel cylinder decreases as above described. Then, the check valve device 105 takes the position D. Accordingly, the brake fluid drawn from the reservoir 25 by the fluid pressure pump 113 is supplied to the master cylinder 101. Accordingly, the brake pedal 102 is pushed back, and the stroke of the brake pedal 102 decreases as shown in FIG. 4B. Since the motor 114 starts to be driven at time $t_2$, strictly describing, the discharging pressure of the fluid pressure pump is increased from zero at time $t_2$, and it becomes equal to the master cylinder pressure at a certain time. Before that time, the stroke of the brake pedal 102 slowly increases and then after the discharging pressure of the fluid pressure pump 113 becomes higher than the master cylinder pressure, the stroke of the brake pedal 102 decreases rapidly. The discharging pressure of the fluid pressure pump 113 exhibits ripples as shown in FIG. 4B.

Next, when the acceleration signal +b is generated at time $t_3$, the output EV is generated and the level of the control signal S becomes "½". Accordingly, the brake fluid pressure is held constant as shown in FIG. 4A. At that time, the output of the OFF delay timer 81 is already "1" in FIG. 12. Accordingly, with the dissipation of the output signal AV, the output of the AND gate 82 becomes "1" and so the drive signal P is generated. The check valve device 105 takes the position E in FIG. 11. The fluid is prohibited from flowing to the master cylinder side. Accordingly, although the fluid pressure pump 113 continues to be driven, the brake fluid is not supplied to the master cylinder 101 and so the stroke of the brake pedal 102 is held constant. At that time, the high fluid pressure of the fluid pressure pump 113 is supplied to the input port of the changeover valve 107 and the check valve device 105. When it becomes higher than a predetermined value, the check valve 118 as a relief valve is opened and the discharging brake fluid from the fluid pressure pump 113 is relieved into the reservoir 103. Accordingly, the input port of the changeover valve 107 and the check valve device 105 are protected from damage.

When the acceleration signal +b disappears at time $t_4$, the output of the AND gate 72 in FIG. 12 becomes "1". Accordingly, the pulse generator 74 is driven for the delay time of the OFF delay timer 73 and so the output EV changes in steps. The fluid pressure of the wheel cylinder increases in steps slowly, as shown in FIG. 4A. At that time, the check valve device 105 takes the position E. However, the check valve device 105 permits the brake fluid to flow from the master cylinder side. The fluid pressure is supplied to the wheel cylinder side through the check valve device 105 and changeover valve 107 also from the master cylinder 101. Accordingly, the stroke of the brake pedal 102 increases in steps as shown in FIG. 4B.

When the brake relieving signal is generated at time $t_5$, the output of the AND gate 82 in FIG. 12 becomes "0", and so the signal P disappears. The check valve device 105 is changed over again into the position D. The fluid pressure of the wheel cylinder decreases as shown in FIG. 4A. However, the discharging fluid of the fluid pressure pump 113 is returned into the master cylinder 101, and so the stroke of the brake pedal 102 is decreased as shown in FIG. 4B.

When the acceleration signal +b is generated at time $t_6$, the output EV is generated and so the fluid pressure of the wheel cylinder is held constant. However, since the output AV disappears, the output of the AND gate 82 becomes "1". Accordingly, the drive signal P is generated to change over the check valve device 105 into the position D.

Thus, the stroke of the brake pedal 102 is maintained constant as shown in FIG. 4B. Hereinafter, the above operations or controls are repeated. When the vehicle is decelerated to the desirable speed or stops, the brake pedal 102 is released from treading. Accordingly, brake fluid from the wheel cylinder is returned through the conduit 108, changeover valve 106, the check valve 119 and the check valve device 105 into the master cylinder 101. Thus, the brake is relieved.

If the check valve device 105 were changed over into the position E all through the time of the anti-skid control operation, all of the brake fluid for brake relieving or almost all of that would be discharged into the reservoir 103 and so the stroke of the brake pedal 102 would be lengthened more as shown by the dashed line in FIG. 5B. At last, the stroke of the brake pedal might reach the full distance, for example, at time $t_7$. At that time, the driver would feel that the brakes had failed Further, pressurized fluid could not be supplied from the master cylinder after time $t_7$. It could be supplied only by the fluid pressure pump 113. The supply rate would be reduced much. The braking force would be insufficient.

In the third embodiment, when the brake fluid pressure is decreased, or when the brake relieving signal is generated, brake fluid is continuously returned into the master cylinder 101 for the generation of the brake relieving signal and so the stroke of the brake pedal 102 is decreased as shown in FIG. 4B. Instead of such a control method, the circuit shown in FIG. 5 may be used for stepwisely the pedal stroke in steps.

In the third embodiment, the output AV is directly supplied to the negation input terminal of the AND gate 82. However, in this modification, the output AV is supplied through the pulse generator 85 to the negation input terminal of the AND gate 82. Accordingly, when the output AV is generated from the wheel 109, the output of the AND gate 82 changes in steps and so the drive signal P changes in steps and the check valve device 105 is changed over alternately to the positions D and E. in steps, the stroke of the brake pedal 102 decreases stepwisely as shown in FIG. 6B. The fluid pressure of the wheel cylinder changes similarly as shown in FIG. 6A.

In the above third embodiment and the above modification, the changeover time or the total of the intermittent changeover time of the check valve device 105 is equal to the generating time of the brake relieving signal. Instead, it may be lengthened by a predetermined time, for example, by an OFF delay timer. In that case, the stroke of the brake pedal 102 changes as shown in FIG. 6C or D. Or when the brake pressure is maintained constant after the initial brake relieving control, the check valve device 105 may be changed over driving the generation of the brake holding signal or during part of the generating time of the brake holding signal. With such a control method, the stroke of the brake pedal 102 can be decreased more than that in the third embodiment. With the above modifications, from the stroke of the brake pedal 102 can be prevented unnecessarily increases. Further, the pedal stroke can be adjusted in the brake relieving operation providing better feel for the driver.

Figure 13:
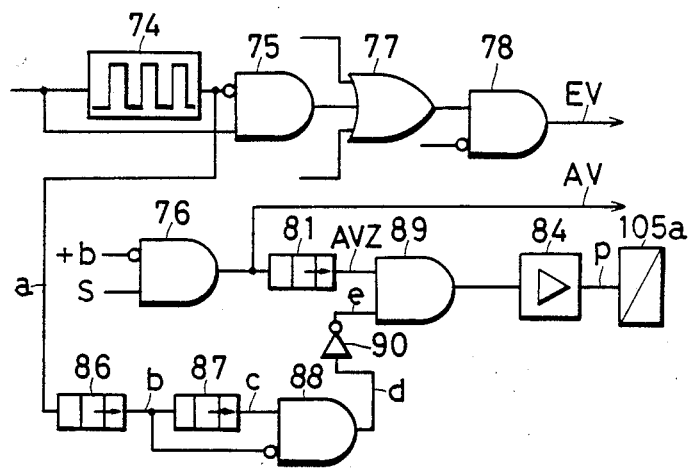
FIG. 13 is a circuit diagram of an important part of a control unit in a brake fluid pressure control apparatus according to a fourth embodiment of this invention.

FIG. 13 shows the fourth embodiment of this invention. The conduit system is the same as that of the third embodiment. The different portions of the control unit 112 are shown in FIG. 13 and the parts in FIG. 13 which correspond to those in FIG. 12 are denoted by the same reference numerals.

In this embodiment, the output of the pulse generator 74 is supplied to the first OFF delay timer 86. The output of the timer 86 is supplied to one input terminal of an AND gate 88 through a second OFF delay timer 87 and it is directly supplied to a negation input terminal of the AND gate 88. An output terminal of the AND gate 88 is connected to one input terminal of an AND gate 89 ghrough an inverter 90. The output AV is supplied through the OFF delay timer 81 to another input terminal of the AND gate 89. An output terminal of the AND gate 89 is connected to the amplifier 84 in the same manner as that in the third embodiment.

The outputs of the pulse generator 74, first and second OFF delay timers 86, 87, AND gate 88 and inverter 90 are denoted as a, b, c, d and e as shown in FIG. 13, respectively. The time relationships among them are the same as shown in FIG. 8 of the second embodiment. As described with respect to the first embodiment, the fluid pressure is increased in steps by the pulse output a of the pulse generator 74. The pulse width is lengthened by the delay time $T_1$ of the first OFF delay timer 86 and it is lengthened further by the delay time T2 of the second OFF delay timer 87. From the above relationships, the pulse width of the output d of the AND gate 88 is equal to T2.

In the conduit system of FIG. 11, the brake pedal 102 is trodden and the anti-skid control is effected. Accordingly, the fluid pressure P of the wheel cylinder changes as shown in FIG. 9A. When the brake pedal 102 is trodden at time $t_0$, the fluid pressure P increases as shown in FIG. 9A and the stroke of the brake pedal 102 increases as shown in FIG. 9B. When the brake holding signal is generated at time $t_1$, the fluid pressure P is maintained constant and the stroke of the brake pedal 102 increases at a smaller rate. When the brake relieving signal is generated at time $t_2$, in FIG. 13, the output AVZ is generated from the OFF delay timer 81 and it is supplied to the one input terminal of the AND gate 89. Since then the output of the NOT gate 90 is then "1", the output of the AND gate 89 becomes "1" and so the drive signal is generated.

Accordingly, the fluid pressure P is decreased as shown in FIG. 9A and the check valve device 105 is changed over into the position E. The stroke of the brake pedal 102 is maintained at constant. Strictly speaking, the discharge pressure of the fluid pressure pump 113 starts to increase at time $t_2$ from zero. After a certain time, it reaches the master cylinder pressure after which, the stroke of the brake pedal 102 is maintained at constant.

When the pulse generator 74 is driven at time $t_3$, the stepwise signal is generated. Accordingly, the fluid pressure P of the wheel cylinder increases in steps as shown in FIG. 9A. The output d as shown in FIG. 8 is generated with output a of the pulse generator 74 from the AND gate 88. Thus, during the generation of this signal, the drive signal P is generated and so the check valve device 105 is changed over alternately into the positions D and E with the timing of the pulse d. Accordingly, the stroke of the brake pedal 102 is decreased in steps during the generation of the stepwise brake holding signal as shown in FIG. 9B.

The width of the pulse d and therefore the delay time T2 of the second OFF delay timer 87 may be changed in accordance with the pulse width a in FIG. 8 or the pulse duration time of the pulse generator 74. Or the pulse time duration of the pulse generator 74 may be changed in accordance with the time duration of the previous brake relieving signal or the previous stepwise braking time.

Figure 14:
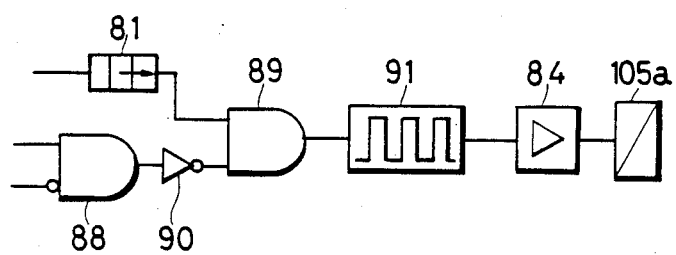
FIG. 14 is a circuit diagram of an important part of a control unit according to one modification of the control unit of the fourth embodiment.

Further, as one modification of the fourth embodiment, a second pulse generator 91 may be arranged between the output terminal of the AND gate 89 and the input terminal of the amplifier 84 as shown in FIG. 14. Thus, the stroke of the brake pedal 102 is changed as shown in FIG. 9C.

Also in the fourth embodiment and the above modification, the driver does not have the unpleasant feeling that the brake pedal has reached the full stroke. The braking force does not become insufficient. The stroke of the pedal on the reapplication can be adjusted after the first brake decreasing control operation. Thus, the driver feels better.

The third and fourth embodiments relate only to the anti-skid control apparatus. However, the conduit system of FIG. 11 may be used also for drive slip control as that of FIG. 1. In that case, a circuit similar to that of FIG. 3 can be used. The wheel speed sensor 28a, the solenoid portions 30a and 64a and signal Pa are substituted for by the wheel speed sensor 111, the solenoid portions 107a and 105a and signal P, in FIG. 3, respectively. With such a modification, the anti-skid control and drive slip control can be effected in the same manner as in the first embodiment.

Figure 5:
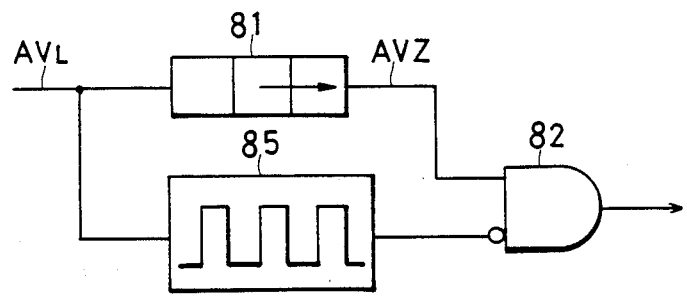
FIG. 5 is a circuit diagram of an important part of a control unit according to one modification of the control unit of the first embodiment.
Figure 6:
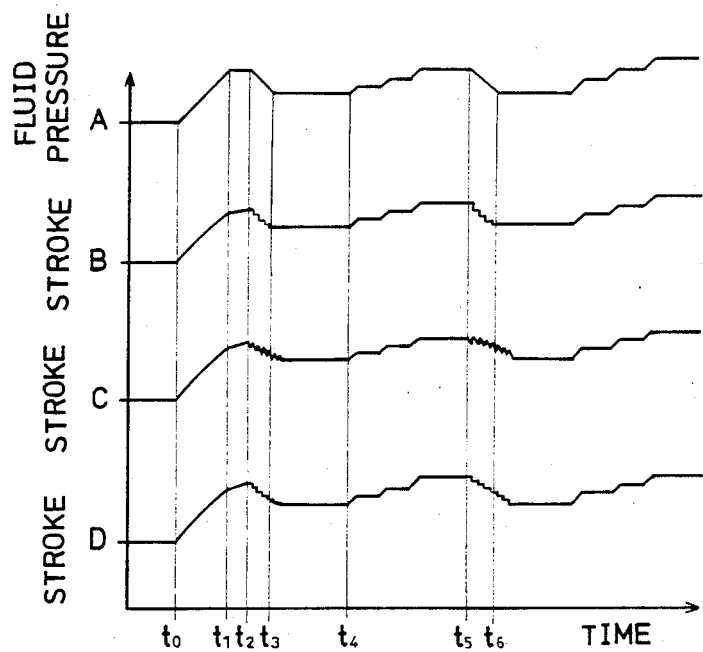
FIG. 6 is a set of graphs explaining operations of the one modification and further modifications.

Further, the conduit system of FIG. 11 may be used with the control unit as shown in FIG. 5, FIG. 7 or FIG. 10 according to the first or second embodiment or the modification.

Figure 15:
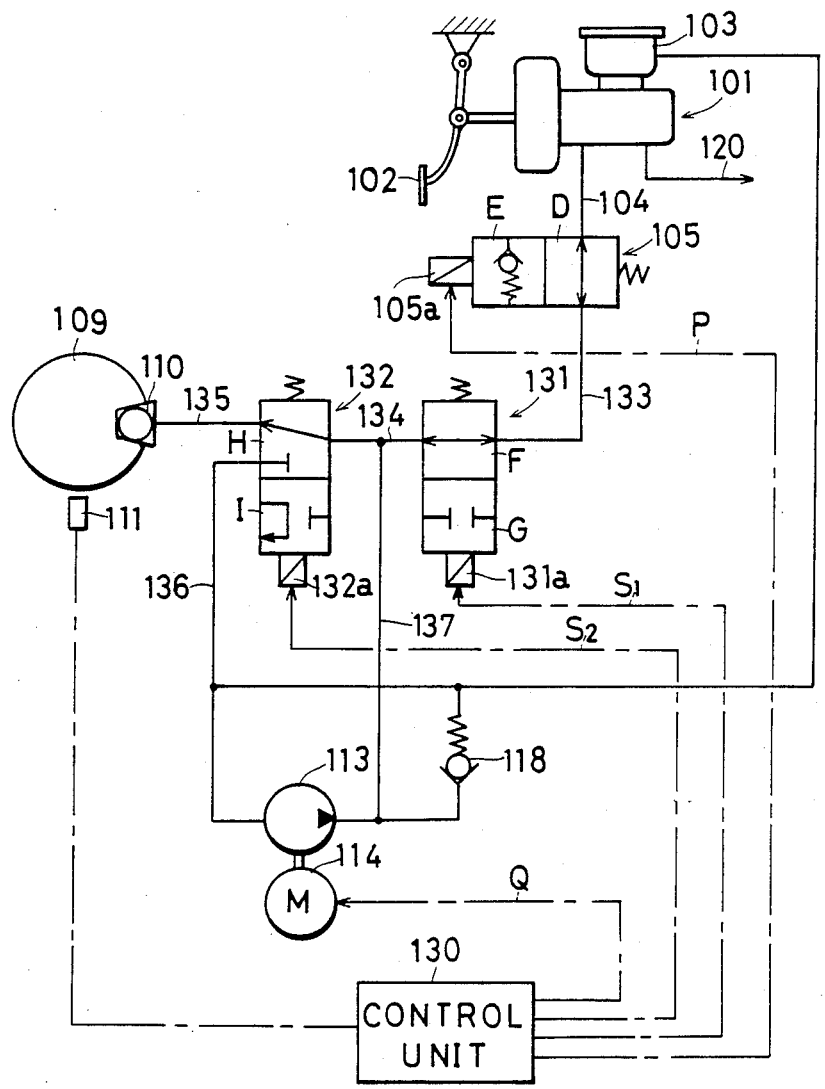
FIG. 15, FIG. 16 and FIG. 17 are schematic views of brake pressure control apparatus to modifications of the brake pressure control apparatus of FIG. 11.

FIG. 15 shows a first modification of the conduit system of FIG. 11. Parts in FIG. 15 which correspond to those in FIG. 11 are denoted by the same reference numerals.

In this modification, two valves 131 and 132 are used instead of the one change-over valve 107 in FIG. 11. A conduit 133 is connected to the check valve device 105 and connected to the one valve 131. It is connected to the other valve 132 through a conduit 134. A conduit 137 devided from the conduit 134 is connected to the discharging side of the fluid pressure pump 113. The second valve 132 is connected to the wheel cylinder 110 through a conduit 135. The check valve device 105 is controlled for the braking slip control and driving slip control in the same manner as the above described embodiments.

In the braking slip control and the driving slip control, when the braking force is increased, control signals S1 and S2 from a control unit 130 are "0" and therefore the solenoid portions 131a and 132a are not energized. Accordingly, the fluid pressure from the conduit 133 is supplied to the wheel cylinder 110 through the valves 131 and 132.

In the drive slip control, the fluid pressure of the pump 113 is supplied to the wheel cylinder 110 through the conduit 137 and the valve 132. And when the brake is relieved, the control signal S1 to the solenoid portion 131a of the first valve 131 is "1" and it takes a position G. Both sides of the valve 131 are interrupted from each other and a control signal S2 to the solenoid portion 132a of the second valve 132 is "1" and it takes a position I. Thus, the pressurized fluid from the wheel cylinder 110 is returned to the reservoir 103 through the second valve 132 and the conduit 136.

When the braking force is maintained constant, the first valve 131 takes the position G. Thus, the control signal S1 to the solenoid portion 131a becomes "1". However the control signal S2 to the solenoid portion 132a of the second valve 132 remains "0". Accordingly to this modification, in the driving slip control, the braking force can not be maintained constant. Accordingly, the brake relieving and reapplication are repeated for the driving slip control.

Figure 16:
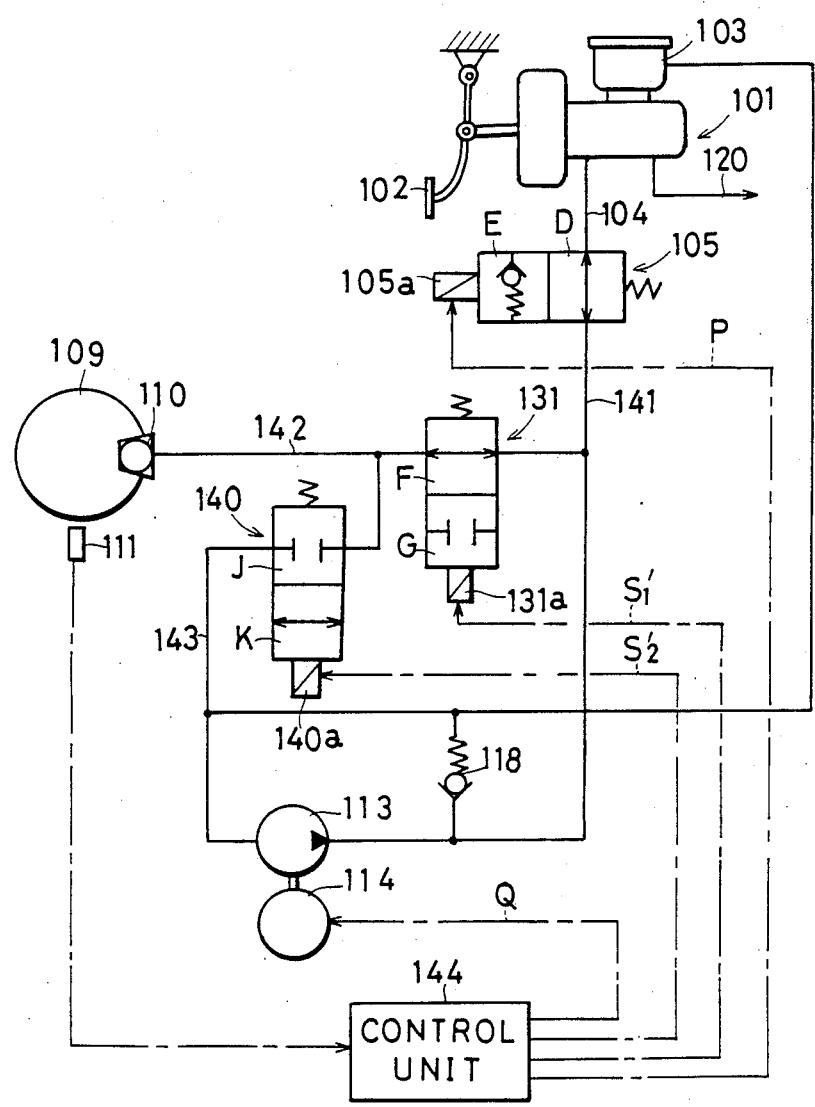

FIG. 16 shows a second modification of the conduit system of FIG. 11. Parts in FIG. 16 which correspond to those in FIG. 11 are denoted by the same reference numerals.

In this modification, when the solenoid portion 140a of the second valve 140 is not energized, both sides of the valve 140 are disconnected from each other and when it is energized, both sides of the valve 140 are connected to each other. The discharge port of the fluid pressure pump 113 is connected to the conduit 141. The conduit 142 divided from the conduit connecting the first and second valves 131 and 140 is connected to the wheel cylinder 110.

The operations of the check valve device 105 for the driving slip control and the anti-skid control are the same as those of the above embodiments. When the brake is applied, the control signals S'1 and S'2 to the solenoid portions 131a and 140a of the valves 131 and 140 are "0". Thus, the pressurized fluid from the conduit 141 is transmitted to the wheel cylinder 111 through the first valve apparatus 131 and the conduit 142.

When the brake force is maintained constant, the control signal S'1 becomes "1" and the control signal S'2 remains "0". Accordingly, the pressurized fluid from the conduit 141 is not transmitted to the wheel cylinder 110. And when the brake is relieved, the control signal S'1 becomes "1" and also the control signal S'2 becomes "1". Thus the second valve 140 takes the position K. The pressurized fluid from the wheel cylinder 110 is returned to the reservoir 103 through the conduit 142, the second valve 140 and the conduit 143. Thus the brake is relieved.

Figure 17:
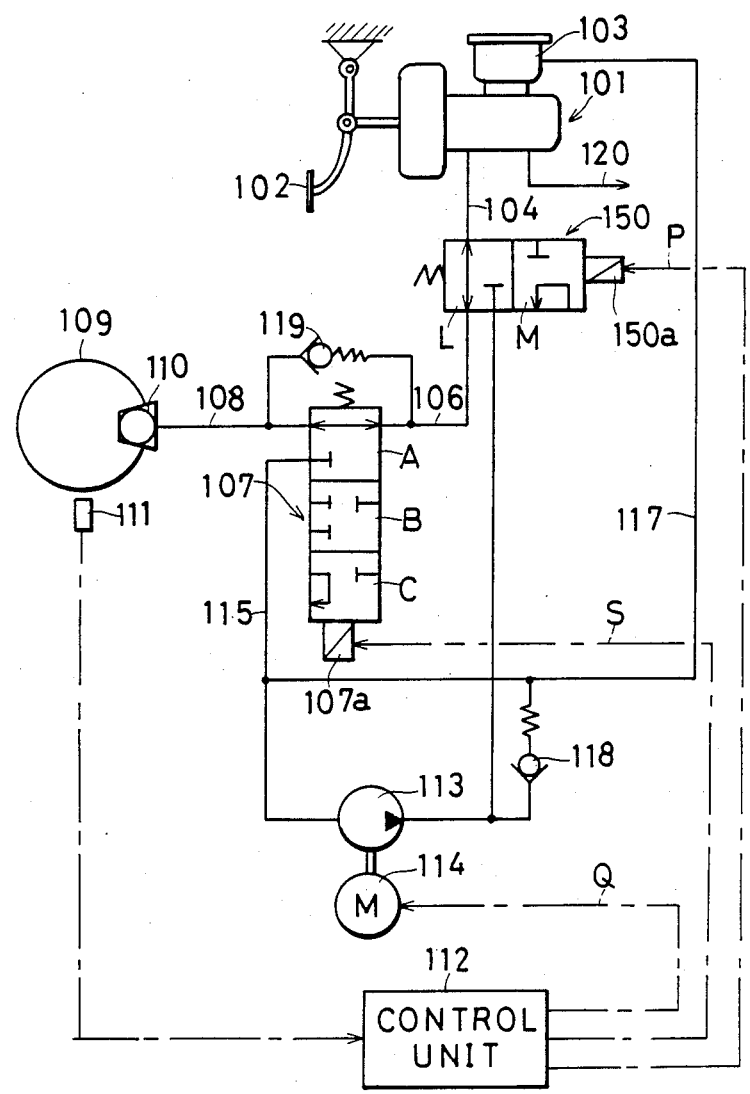

FIG. 17 shows a third modification of the conduit system of FIG. 11. Parts in FIG. 17 which correspond to those in FIG. 11 are denoted by the same reference numerals.

In this modification, a three port-two position change-over valve 150 is used instead of the check valve device 105. In the driving slip control, the control signal P from a control unit 112' becomes "1" and the solenoid portion 150a is energized. It takes a position M. Thus the fluid pressure of the fluid pressure pump 113 is transmitted to the wheel cylinder 110 through the valve 150 and conduit 106. In the anti-skid control, the solenoid portion 150a is alternately energized and deenergized. Thus the valve device 150 takes alternately the position L or M.

While the preferred embodiments have been described, variations thereto will occur to those skilled in the art within the scope of the present inventive concepts which are delineated by the following claims.

For example, in the first embodiment, during the anti-skid control, only when the brake relieving signal is generated, the check valve device takes the first position during the time depending on the generation of the brake relieving signal. In the other cases, the check valve device takes the second position. Further, in the second embodiment, only when the brake is reapplied does the check valve device take the first position. It takes the second position in the other cases. Instead of those controls, the check valve device may be made to take the first position both in the brake relieving control and in the brake reapplication. In that case, the check valve device takes a first position for the time depending on the brake relieving time or for the time depending on the brake reapplying time after the first brake relieving signal.

Further, in the above embodiments, the check valve device takes the first position during generation of the brake relieving signal or for a longer time than the generation of the brake relieving signal. Instead, the check valve device may take the first position for shorter time than the generation of the brake relieving signal.

Further, in the above embodiments a front-wheel drive vehicle has been described. Instead, this invention is applicable to a vehicle having rear drive. In that case, the changeover valves 4a and 4b are arranged between the master cylinder and the wheel cylinders of the rear wheels and the connecting relationship to the pressure selecting apparatus 8 is inverted between the front wheels and rear wheels.

Further, this invention is applicable to a four-wheel-drive (4WD) vehicle. The four wheel-drive (4WD) vehicle includes a torque distribution mechanism and so the drive slip can be prevented through the torque distribution mechanism.

Further, the pressure selecting apparatus is not limited to the apparatus shown but various pressure selecting apparatus such as an apparatus proposed previously by this applicant in the Japanese patent opening gazette No. 41657/1986 and No. 68166/1987 may be used.

Further in the above embodiments, the fluid pressure control valve is controlled by the logical sum of the skid conditions of the front wheel and anyone of the rear wheels. Instead, the fluid pressure control valve may be controlled by various logical combinations.

Further in the above embodiments, the hydraulic reservoir with which a master cylinder is provided, is described as a hydraulic reservoir. Instead of that, a special hydraulic reservoir may be arranged at the intake side of the fluid pressure pump and the necessary amount for the control of the drive slip may be reserved in the hydraulic reservoir. Further in the above embodiments, the check valves 65a and 65b as the relief valves are arranged between the discharging ports of the fluid pressure pumps 20a, 20b and the conduit 27. For the check valves 65a and 65b, to be fail safe, other check valves may be connected between the discharging ports of the fluid pressure pumps 20a, 20b and the check valve devices 26a, 26b. These check valves permit fluid to flow toward the check valve devices.

Further in the above embodiments, the check valves 19a and 19b are arranged in parallel with the changeover valves 4a and 4b. Instead, the check valves may be arranged in by-pass conduits by-passing the changeover valves 4a and 4b and the check valve devices 26a and 26b or conduits connecting the conduits 3, 16 and 5, 17. The check valves permit fluid to flow toward the master cylinder side.

Further in the above embodiments, the circuit shown in FIG. 3 is used for measuring the skid condition of the wheels. Other well known judging circuits may be applicable to this invention.

Further, the fluid pressure control valves 4a, 4b, 107, 131, 132, 140 may be combined with the valve apparatus 26a, 26b, 105, 150, in the above embodiments. In other words, the fluid pressure control valves or the valve apparatus may be so constructed as to function also as valve apparatus or fluid pressure control valves. In the above embodiments, the two-channel system in which the two fluid pressure control valves are used has been described. Instead, a four-channel (full-channel) control system in which fluid pressure control valves are provided for the respective wheels may be used or a three-channel control system may be used. This invention is applicable to all conduit-types including X-conduit type and front-rear separation type.

What is claimed is:

1. In a brake fluid pressure control apparatus for a vehicle having at least one wheel and a brake for the wheel including:
   (A) a fluid pressure control valve device arranged between a master cylinder and a wheel cylinder of said brake for the wheel, said fluid pressure control valve device receiving control signals of a control unit measuring the skid condition of the wheel to control the brake fluid pressure to said wheel cylinder;
   (B) a hydraulic reservoir which, when the brake fluid pressure to said wheel cylinder is decreased with control of said fluid pressure control valve device, reserves the brake fluid discharged through said fluid pressure control valve device from said wheel cylinder;
   (C) a pressure fluid supply conduit connecting said master cylinder with said fluid pressure control valve device;
   (D) a fluid pump for returning the brake fluid from said hydraulic reservoir into said pressure fluid supply conduit; and (E) a valve apparatus arranged in a conduit connecting the discharging side of said fluid pump with said master cylinder side, in said pressure fluid supply conduit, said valve apparatus taking a first position for free communicating with both of said sides and a second position for cutting off the fluid flow from said discharging side of the fluid pump towards said master cylinder side; the improvements in which said valve apparatus normally takes said first position, and during anti-skid control, takes said first position continuously for a certain time depending on the control time of the fluid pressure decrease and continuously for another certain time depending on the control time of increasing again the fluid pressure after the fluid pressure decrease, and takes said second position continuously for times other than said certain times.

2. A brake fluid pressure control apparatus according to claim 1, in which said valve apparatus functions as a check valve to permit brake fluid to flow from said master cylinder side towards the side of said fluid pressure control valve device, in said second position.

3. A brake fluid pressure control apparatus according to claims 1, in which said hydraulic reservior is a hydraulic reservior with which said master cylinder is provided.

4. A brake fluid pressure control apparatus according to claims 1, in which a connecting path is arranged for connecting said discharging side of the fluid pump with said hydraulic reservoir, and a relief valve is arranged in said connecting path, said relief valve relieving the brake fluid discharged from said fluid pump into said hydraulic reservoir, when the discharging pressure of said fluid pump becomes higher than a predetermined value.

5. A brake fluid pressure control apparatus according to claim 4, in which a check valve is arranged in a conduit connecting said discharging side of the fluid pump with said valve apparatus, said check valve permitting brake fluid to flow from said discharging side of the fluid pump towards said valve apparatus.

6. In a brake fluid pressure control apparatus for a vehicle having at least one wheel and a brake for the wheel including:
 (A) a braking slip control apparatus for said wheel;
 (B) a driving slip control apparatus for said wheel;
 (C) a fluid pressure control valve device, receiving control signals of a control unit measuring the braking slip and driving slip condition of the wheel to control the brake fluid pressure to the wheel cylinder of said wheel;
 (D) a hydraulic reservoir which, when the brake fluid pressure to said wheel cylinder is decreased with control of said fluid pressure control valve device, reserves the brake fluid discharged through said fluid pressure control valve device from said wheel cylinder;
 (E) a fluid pump for returning the brake fluid from said hydraulic reservoir into a brake fluid supply conduit connecting a master cylinder with said wheel cylinder and
 (F) a valve apparatus arranged in a conduit connecting the discharging side of said fluid pump with said master cylinder side, in said brake fluid supply conduit, said valve apparatus taking a first position for free communicating with both of said sides and a second position for cutting off the fluid flow from said discharging side of the fluid pump towards said master cylinder side; the improvements in which said valve apparatus normally takes said first position, and during braking slip control, takes said first position continuously for a certain time depending on the control time of the fluid pressure decrease continuously for another certain time depending on the control time of increasing again the fluid pressure after the fluid pressure decrease, and takes said second position continuously for times other than said control times, and during driving slip control, said valve apparatus takes said second condition.

7. A brake fluid pressure control apparatus according to claim 6, in which said valve apparatus functions as a check valve to permit brake fluid to flow from said master cylinder side towards the side of said wheel cylinder, in said second position.

8. A brake fluid pressure control valve apparatus according to claim 6, in which said valve apparatus functions as a cut-off valve to cut off fluid communication at both sides, in said second position.

9. A brake fluid pressure control apparatus according to claims 6, in which said hydraulic reservoir is a hydraulic reservoir with which said master cylinder is provided.

10. A brake fluid pressure control apparatus according to claim 6 in which said hydraulic reservoir is a hydraulic reservoir arranged separately from a hydraulic reservoir with which said master cylinder is provided.

11. A brake fluid pressure control apparatus according to claims 6, in which a connecting path is arranged for connecting said discharging side of the fluid pump with said hydraulic reservoir, and a relief valve is arranged in said connecting path, said relief valve relieving the brake fluid discharged from said fluid pump into said hydraulic reservoir, when the discharging pressure of said fluid pump becomes higher than a predetermined value.

12. A brake fluid pressure control apparatus according to claim 11, in which a check valve is arranged in a conduit connecting said discharging side of the fluid pump with said valve apparatus, said check valve permitting brake fluid to flow from said discharging side of the fluid pump towards said valve apparatus.

13. A brake fluid pressure control apparatus according to claim 6, in which said fluid pressure control valve device functions also as said valve apparatus.

14. In a brake fluid pressure control apparatus for a vehicle, including:
 (A) a braking slip control apparatus for wheels, said wheels consisting a pair of front wheels and a pair of rear wheels;
 (B) a driving slip control apparatus for said wheels;
 (C) a first fluid pressure control valve device arranged between a first fluid pressure generating chamber of a brake master cylinder and a brake apparatus of one of said front wheels and rear wheels to control the brake fluid pressure to said brake apparatus of said one of the front wheels and rear wheels;
 (D) a second fluid pressure control valve device arranged between a second fluid pressure generating chamber of said brake master cylinder and a brake apparatus of the other of said front wheels and rear wheels to control the brake fluid pressure to said brake apparatus of said other of the front wheels and rear wheels;

(E) a hydraulic reservoir which, when the brake fluid pressure to said brake apparatus is decreased with control of one of said first and second fluid pressure control valve device, reserves the brake fluid discharged through one of said first and second fluid pressure control valve device from said brake apparatus;

(F) a fluid pump means for returning the brake fluid from said hydraulic reservoir into pressure fluid supply conduits connecting said master cylinder, and said first and second fluid pressure control valve devices;

(G) a control unit for measuring the braking slip and driving slip condition and generating instructions to control said first and second fluid pressure control valve devices; and (H) a pressure selecting apparatus for generating a fluid pressure in accordance with the lower one of the brake fluid pressures of one of said front wheels and rear wheels controlled with said first and second fluid pressure control valve devices in the brake slip control being arranged between said brake apparatus of the front wheels and those of the rear wheels; said pressure selecting apparatus including a pair of valve parts each for opening and closing a conduit between the brake apparatus of the ones of said front and rear wheels in the corresponding one of the two conduit systems, said valve parts being arranged so as to open and a piston including a pair of fluid pressure receiving portions which the fluid pressure of the corresponding one of said first and second fluid pressure generating chambers of the master cylinder and the fluid pressure of the corresponding one of the brake apparatus of one of said front wheels and rear wheels in the opposite directions, respectively, said piston is located normally at a neutral position for opening said valve parts, and is movable in the directions to close selectively any one of said valve parts, in the braking slip control the improvements in which said hydraulic reservoir always reserves brake fluid, and a valve apparatus is arranged in a conduit connecting the discharging side of said fluid pump with said master cylinder side, in said pressure fluid supply conduit, said valve apparatus taking a first position for free communicating with both of said sides and a second position for cutting off the fluid flow from the side of one of said first and second fluid pressure control valve device towards said master cylinder side and said valve apparatus normally takes said first position, and during the braking slip control, takes said first position for a certain time depending on the control time of the fluid pressure decrease and another certain time depending on the control time of increasing again the fluid pressure after the fluid pressure decrease, and takes said second position for times other said control times, and takes said second position during the driving slip control.

15. A brake fluid pressure control apparatus according to claim 14, in which said valve apparatus functions as a check valve to permit brake fluid to flow from said master cylinder side towards the side of one of said first and second fluid pressure control valve device, in said second position.

16. A brake fluid pressure control apparatus according to claim 14, in which said hydraulic reservoir is a hydraulic reservoir with which said master cylinder is provided.

17. A brake fluid pressure control apparatus according to claim 14, in which a connecting path is arranged for connecting said discharging side of the fluid pump with said hydraulic reservoir, and a relief valve is arranged in said connecting path, said relief valve relieving the brake fluid discharged from said fluid pump into said hydraulic reservoir, when the discharging pressure of said fluid pump becomes higher than a predetermined value.

18. A brake fluid pressure control apparatus according to claim 17, in which a check valve is arranged in a conduit connecting said discharging side of the fluid pump with said valve apparatus, said check valve permitting brake fluid to flow from said discharging side of the fluid pump towards said valve apparatus.

* * * * *